US012461490B2

(12) United States Patent
Lederer et al.

(10) Patent No.: US 12,461,490 B2
(45) Date of Patent: Nov. 4, 2025

(54) HOROLOGICAL DISPLAY MECHANISM WITH SEPARATE DISPLAYS

(71) Applicant: Harry Winston SA, Plan-les-Ouates (CH)

(72) Inventors: Berhnard Karl Lederer, Gals (CH); Cyrille Bernard, La Poueze (FR)

(73) Assignee: Harry Winston SA, Plan-les-Ouates (CH)

( * ) Notice: Subject to any disclaimer, the term of this patent is extended or adjusted under 35 U.S.C. 154(b) by 509 days.

(21) Appl. No.: 17/912,603

(22) PCT Filed: Apr. 1, 2021

(86) PCT No.: PCT/EP2021/058648
§ 371 (c)(1),
(2) Date: Sep. 19, 2022

(87) PCT Pub. No.: WO2021/198434
PCT Pub. Date: Oct. 7, 2021

(65) Prior Publication Data

US 2023/0176524 A1 Jun. 8, 2023

(30) Foreign Application Priority Data

Apr. 3, 2020 (CH) ........................................ 403/20

(51) Int. Cl.
*G04B 19/02* (2006.01)
*G04B 19/20* (2006.01)
(Continued)

(52) U.S. Cl.
CPC ............ *G04B 19/02* (2013.01); *G04B 19/20* (2013.01); *G04B 19/21* (2013.01); *G04B 19/257* (2013.01); *G04B 45/0038* (2013.01)

(58) Field of Classification Search
None
See application file for complete search history.

(56) References Cited

U.S. PATENT DOCUMENTS 10,222,749 B2 * 3/2019 Denden .............. G04B 45/0061
2014/0104991 A1 4/2014 Rochat et al.

FOREIGN PATENT DOCUMENTS

CH 700615 A1 * 9/2010 ............. G04B 19/16
CH 701653 B1 * 2/2011 ........... G04B 19/042
(Continued)

OTHER PUBLICATIONS

Merriam-Webster. (n.d.). Unique definition & meaning. Merriam-Webster. https://www.merriam-webster.com/dictionary/unique (Year: 2025).*
(Continued)

*Primary Examiner* — Regis J Betsch
*Assistant Examiner* — Michael James Walker
(74) *Attorney, Agent, or Firm* — Sughrue Mion, PLLC

(57) ABSTRACT

A horological display mechanism (100) for displaying variables on separate unit display supports (10), each enclosing a display indicator (901; 902) which is a first display (901) capable of moving in translation, or a second display (902) capable of moving in rotation, all of these unit supports (10) include indicators (901; 902) of the same kind, which are either first displays (901) for displaying a first variable, or second displays (902) for displaying a second variable, or both first displays (901) and second displays (902), all visible to the user, the display mechanism (100) includes a control mechanism (300) arranged to drive wheels or rod systems for driving the different display wheel sets and includes a first carrier (111) for driving, by itself, all of the first displays (901), and/or a second carrier (112) for driving, by itself, all of said second displays (902).

24 Claims, 18 Drawing Sheets

(51) Int. Cl.

| | |
|---|---|
| ***G04B 19/21*** | (2006.01) |
| ***G04B 19/257*** | (2006.01) |
| ***G04B 45/00*** | (2006.01) |

(56) References Cited

FOREIGN PATENT DOCUMENTS

| | | | | | |
|---|---|---|---|---|---|
| CN | 103649850 | A | | 3/2014 | |
| CN | 107092180 | A | | 8/2017 | |
| EP | 1 705 535 | A1 | | 9/2006 | |
| EP | 1705535 | B1 | * | 7/2007 | ........... G04B 19/082 |

OTHER PUBLICATIONS

Urwerk, "Historical pieces: UR-202 Urwerk, Swiss watchmakers", 2007, Retrieved from the Internet: https://www.urwerk.com/collections/historical-pieces/ur-202 [retrieved on Mar. 31, 2021], 20 pages.
Ian Skellern, "Urwerk UR-202 The Film", 2008, Retrieved from the Internet: https://www.youtube.com/watch?v=V5MExuc0hxg [retrieved on Apr. 1, 2021], 1 page.
International Search Report of PCT/EP2021/058648 dated Jun. 15, 2021 [PCT/ISA/210].

* cited by examiner

HOROLOGICAL DISPLAY MECHANISM WITH SEPARATE DISPLAYS

CROSS REFERENCE TO RELATED APPLICATIONS

This application is a National Stage of International Application No. PCT/EP2021/058648 filed on Apr. 1, 2021, claiming priority based on Swiss Patent Application No. 00403/20 filed on Apr. 3, 2020.

FIELD OF THE INVENTION

The invention relates to a horological display mechanism for a timepiece, comprising at least one three-dimensional display support, which is arranged for the simultaneous display of at least a first variable on a first three-dimensional display under the action of a first control mechanism, and of a second variable on a second three-dimensional display under the action of a second control mechanism.

The invention further relates to a timepiece, in particular a watch, comprising such a display mechanism.

The invention relates to the field of horological display mechanisms for complicated timepieces.

BACKGROUND OF THE INVENTION

The purpose of horological complications is to provide demanding users with timepieces capable of performing complex functions, and/or comprising innovative displays. The difficulty always lies in reconciling the highly elaborate mechanisms of these timepieces with the low volume available when it comes to watches, and in ensuring correct and intuitive legibility by the user. The other restriction concerns the reliability of these mechanisms, which must go hand in hand with guaranteed chronometric qualities of the basic movement, which must not be altered by the addition of complications.

SUMMARY OF THE INVENTION

The invention aims to produce a watch with displays that are both innovative and extremely logical, and thus easy to read by the user.

For this purpose, the invention relates to a horological display mechanism, for a timepiece, comprising a plurality of separate unit display supports, according to claim 1.

The invention further relates to a timepiece, in particular a watch, comprising such a display mechanism.

BRIEF DESCRIPTION OF THE DRAWINGS

Other features and advantages of the invention will be better understood upon reading the following detailed description given with reference to the accompanying drawings, in which:

FIG. 7 shows the hour digit 11 in FIG. 6, positioned underneath the dynamic pointing index thereof, which is approaching the static index, also pointing, which is linked to the structure of the cylinder; this hour digit is approaching the position that will make this cylinder the active cylinder for displaying the hours; the static index is borne by a ball bearing, fixed to the structure, which guides the hour body at the hour pinion thereof;

FIG. 8 shows a configuration wherein the hour digit 2 in FIG. 6 is not visible, since it is concealed in the rear part of the cylinder; however, this detailed view clearly shows the flap at the end of the maximum stroke thereof in relation to the piston thereof, and reveals the optical indicator, in the groove provisionally made in the space between the piston body and the flap; the flap is in the drawn position, and this cylinder is thus that which displays the current five-minute interval;

FIG. 9 shows the hour digit 12 in FIG. 6, positioned underneath the dynamic index thereof, which is in line with the static index, and thus indicates the current hour: in this figure, the twelve o'clock cylinder is the active hour cylinder: the number twelve faces the user, and the dynamic index borne by the hour body is aligned with the static index borne by a fixed part, in this case a rotating ball bearing guiding the hour body;

DETAILED DESCRIPTION OF THE PREFERRED EMBODIMENTS

Figure 1:
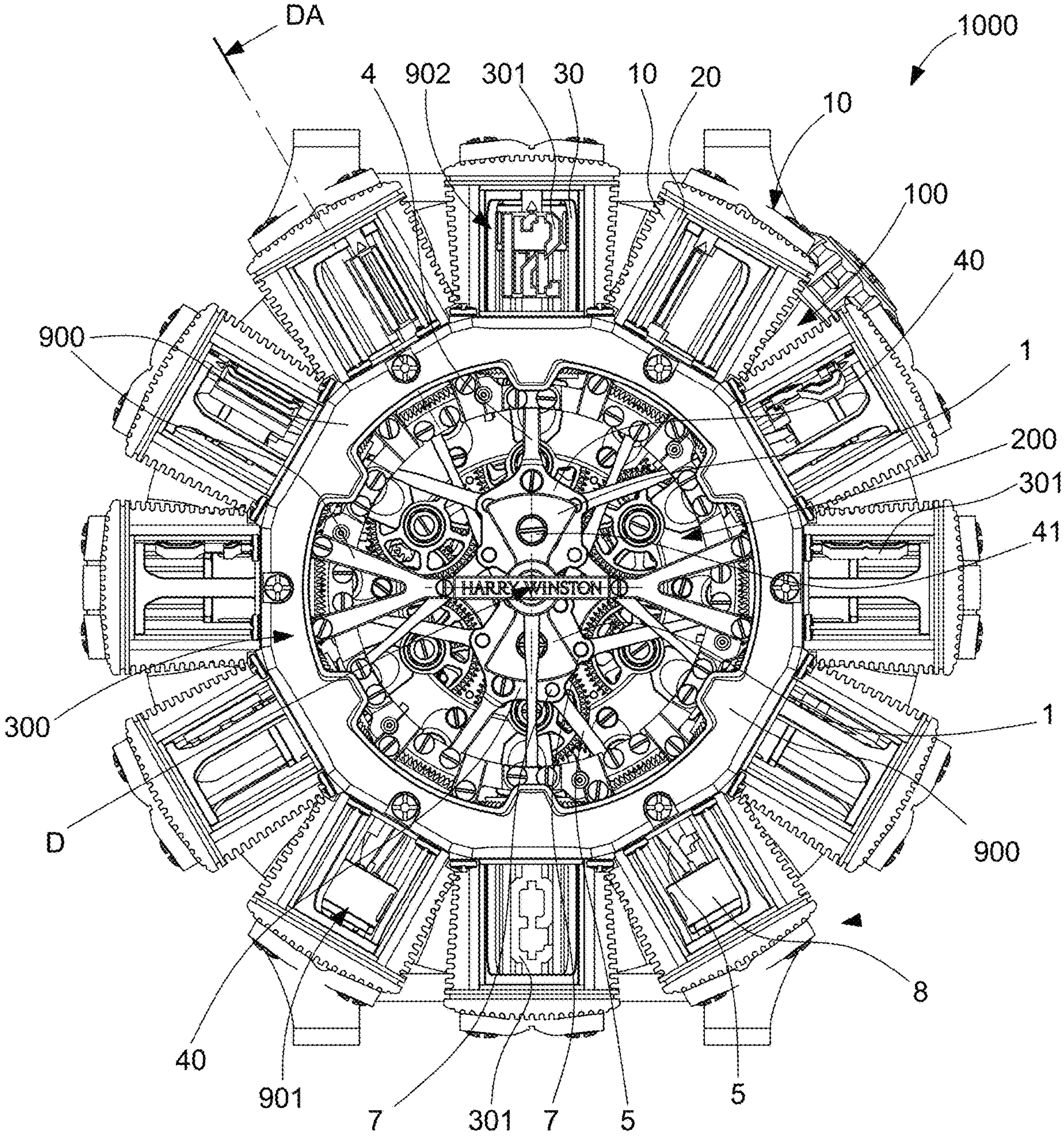
FIG. 1 diagrammatically shows a partial, front view of the top face of a watch comprising a display mechanism according to the invention, which takes the shape of a two-row aircraft engine comprising twelve fixed cylinders arranged in two star-shaped rows. Each cylinder displays, on the one hand, the hour in the form of a rotating display, the active cylinder being the one that displays the one or more hour digits directly facing the user, in this case the 12 o'clock cylinder in this figure, and on the other hand one of the twelve five-minute intervals, the active cylinder being the one that displays a visual mark to the user, for example a highly-visible coloured marker, which comprises a flap that moves relative to a piston, which is capable of moving radially in the cylinder relative to the central axis of the watch, in a basic direction; the minute is estimated in a five-minute interval by the radial marking of the position of the piston relative to the central axis of the watch. Each cylinder comprises a transparent part, through which the user can see a perforated wheel set bearing one or two digits indicating the hour displayed by the cylinder, and capable of moving in rotation inside the cylinder thereof; this perforated wheel set surrounds a piston, which is capable of moving in a to-and-fro motion inside this cylinder, independently of the motion of the perforated wheel set; this piston itself comprises a flap that is capable of moving in translation, visible in other figures. The central part of the mechanism allows a part of the display control mechanism to be viewed, and in particular a crankshaft rotating about the central axis of the watch movement, which drives a connecting rod assembly communicating the to-and-fro motion to all of the pistons.
Figure 2:
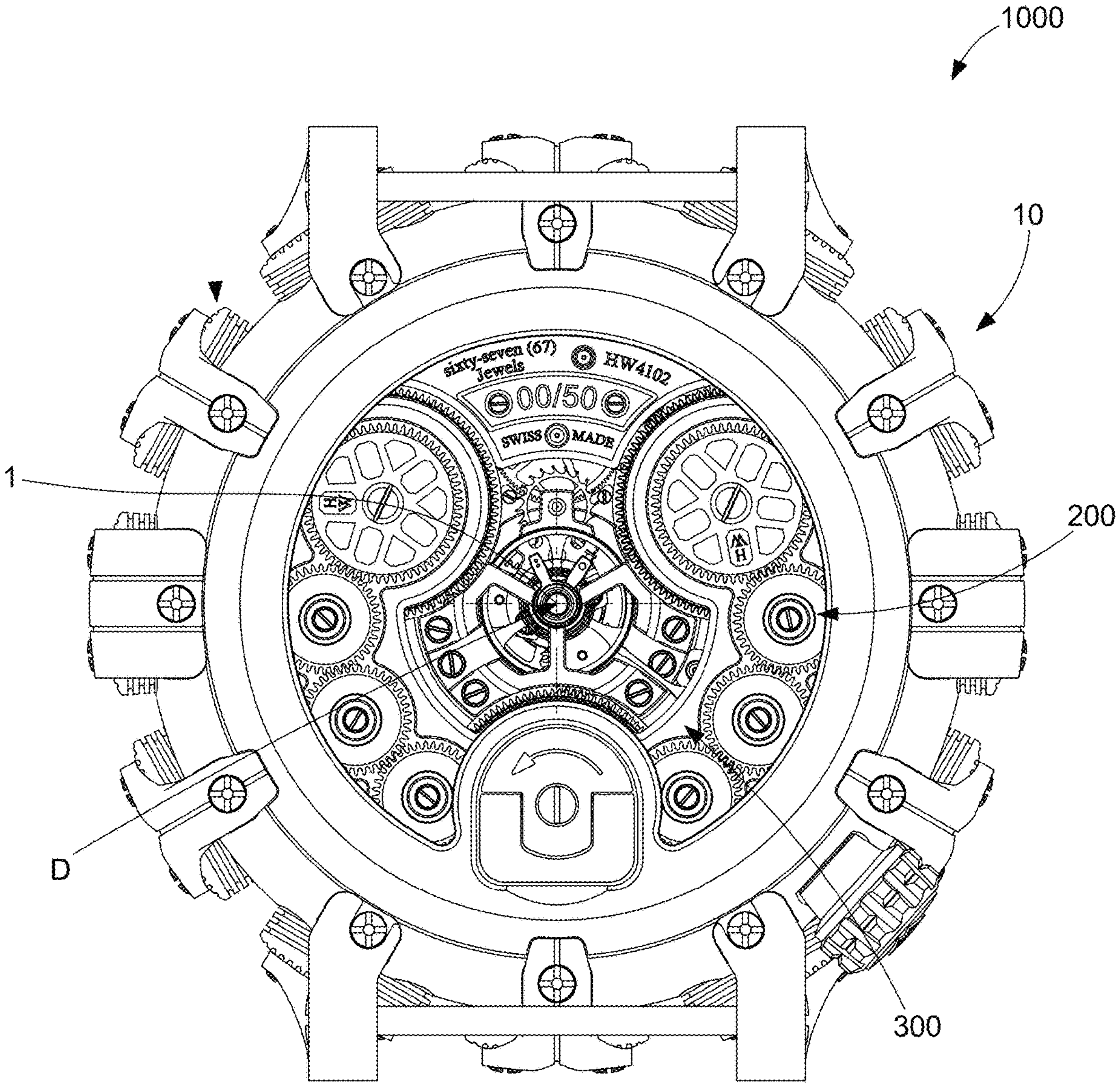
FIG. 2 shows, in a manner similar to FIG. 1, the bottom face of the watch in FIG. 1; the transparent back shows the powering barrels of the watch, which are more specifically intended to drive this display.
Figure 3:
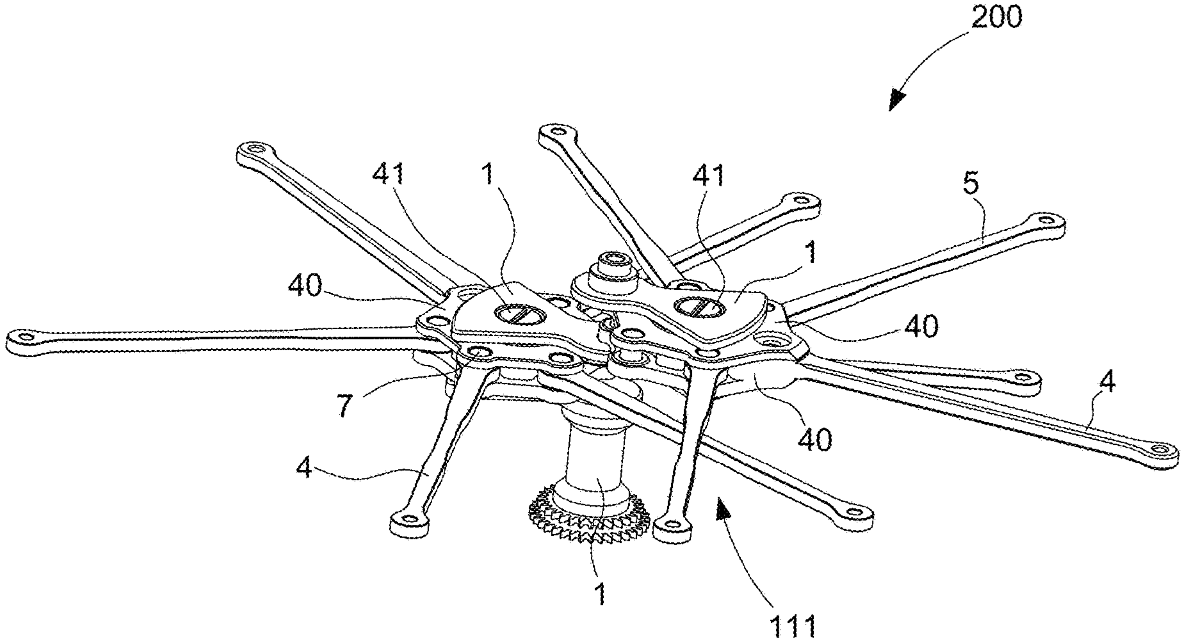
FIG. 3 diagrammatically shows a perspective view of a part of the display control mechanism, with a first carrier designed to drive the pistons, and which comprises this crankshaft, two crank pins whereof bear two plates, each whereof comprises a large fixed connecting rod and five small connecting rods articulated about plate pins.
Figure 4:
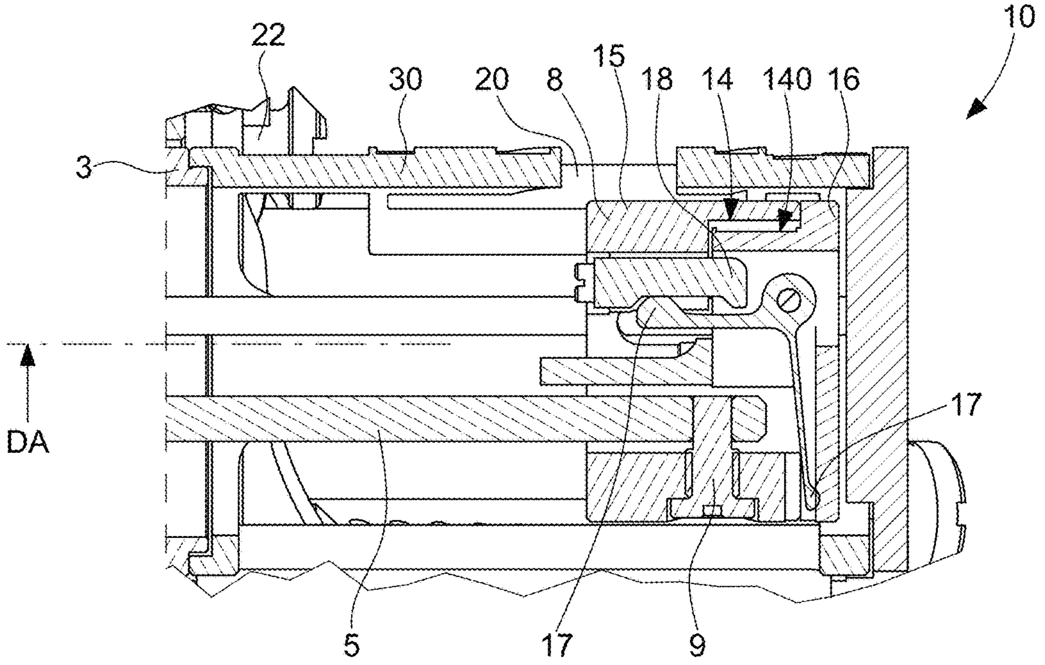
FIG. 4 diagrammatically shows a partial, sectional view through a basic axis of one of the cylinders, of the inner part of the same cylinder situated under the transparent casing in FIG. 1, and which comprises an hour body which is the perforated wheel set bearing the one or more hour digits, which coaxially surrounds the piston, the control rod whereof, articulated about a piston pin, is visible; the flap is capable of moving coaxially to the piston, and comprises an optical indicator which is a visual mark, in this case concealed from the user's view in this view which shows an inactive cylinder for displaying the minutes: the flap is pressed against the piston, and the flap jumper thereof is stopped on a hooking part integral with the piston.
Figure 5:
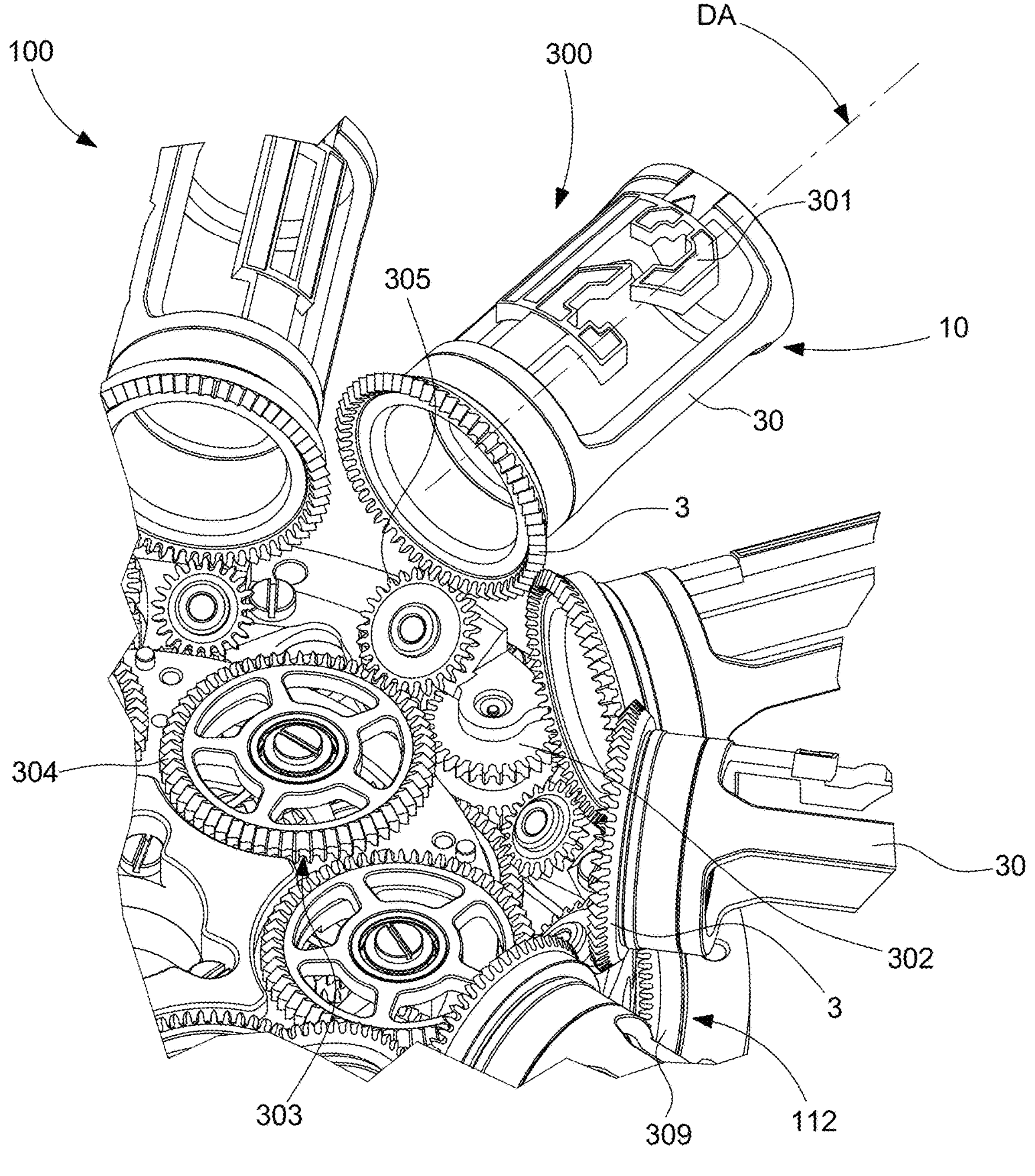
FIG. 5 diagrammatically shows a partial, perspective view of another part of the display control mechanism, and of the control mechanism thereof, with a second carrier designed to drive the hour bodies, comprising a central wheel with an annular shoulder, the straight internal toothing whereof meshes with straight intermediate pinions; these pinions each mesh with a straight-toothed plate which bears a conical intermediate wheel; the latter meshes with a straight-toothed 45° setting wheel, which engages a conical hour pinion integral with the hour body bearing the hour digits.
Figure 6:
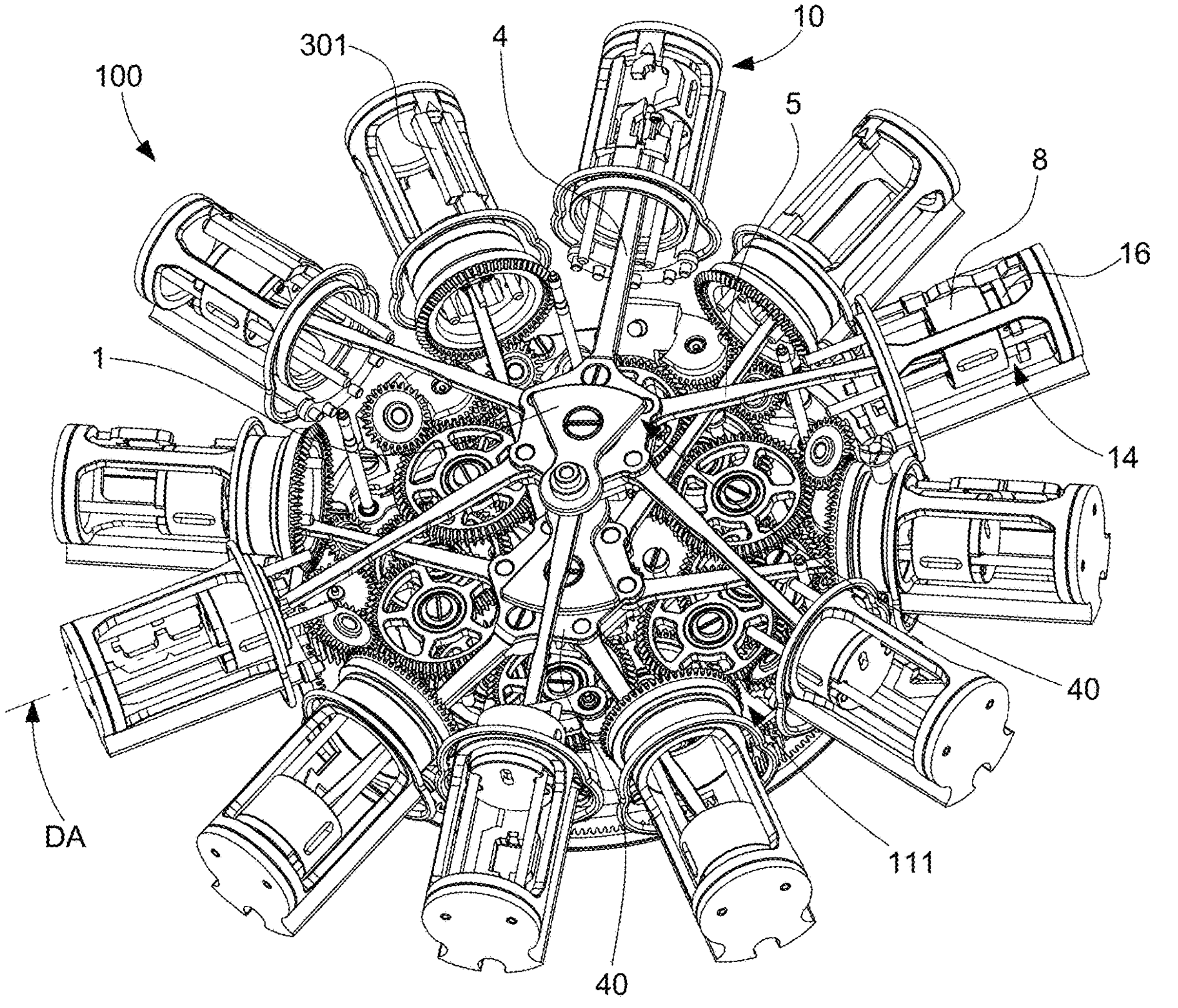
FIG. 6 diagrammatically shows a partial view without the supporting structure, of a part of the moving components of the display mechanism, in one alternative embodiment wherein the hour bodies are transparent wheel sets comprising hour markings; this figure shows the cooperation between the connecting rod assembly in FIG. 3 and the pistons disposed in the cylinders; in the midday position shown in the figure, the hour body displays the hours with the number 12, whereas, in the two o'clock position, the flap is at the end of the maximum stroke thereof in relation to the piston thereof and reveals the optical indicator, for example in the form of a coloured strip or the like, in the groove thus made in the space between the piston body and the flap, for a period of time limited to 5 minutes.
Figure 7:
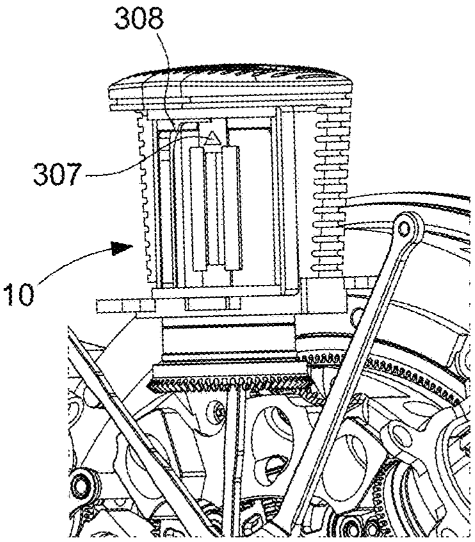
FIGS. 7 to 9 show the rotation of the hour digit in the cylinder thereof.
Figure 8:
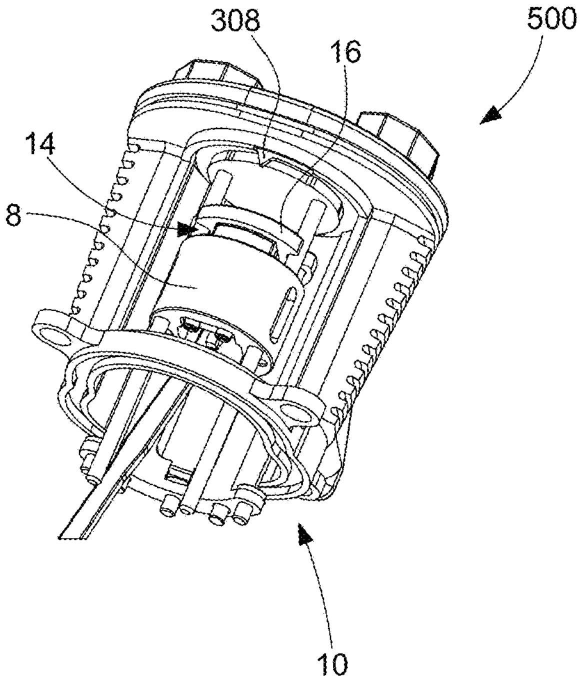
Figure 9:
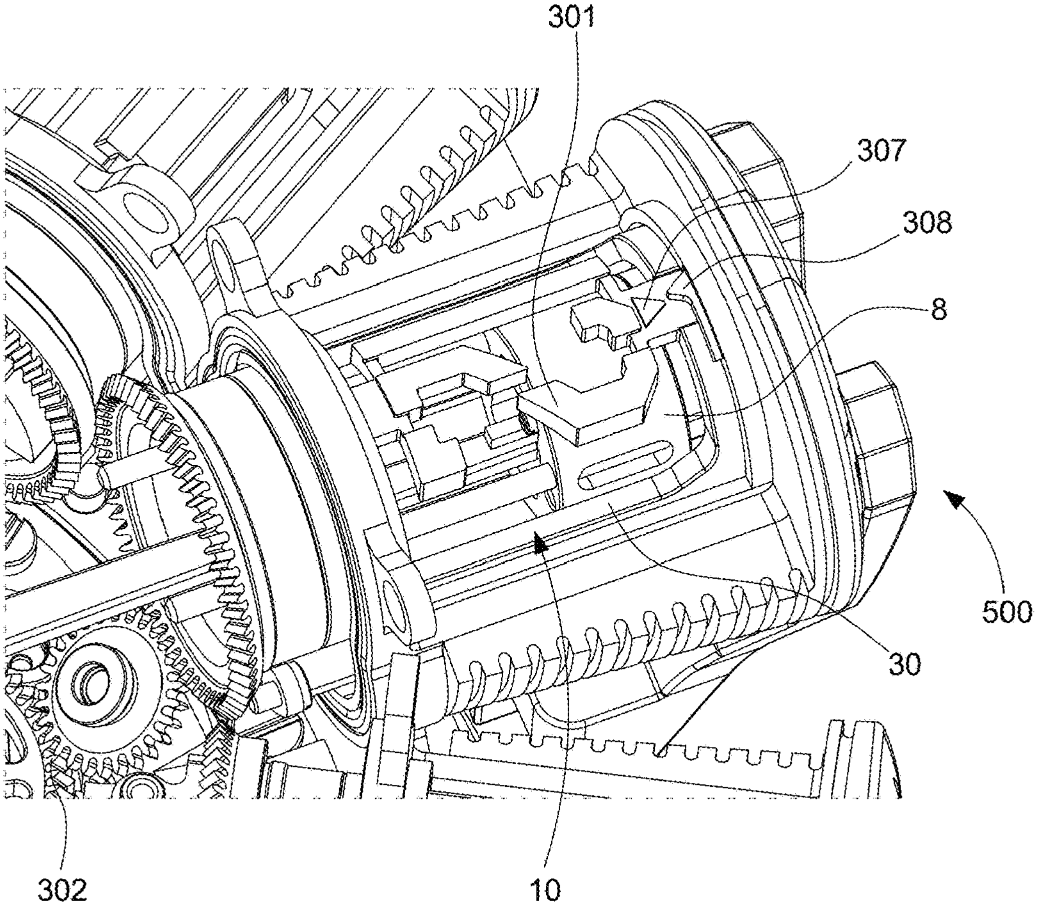
Figure 10:
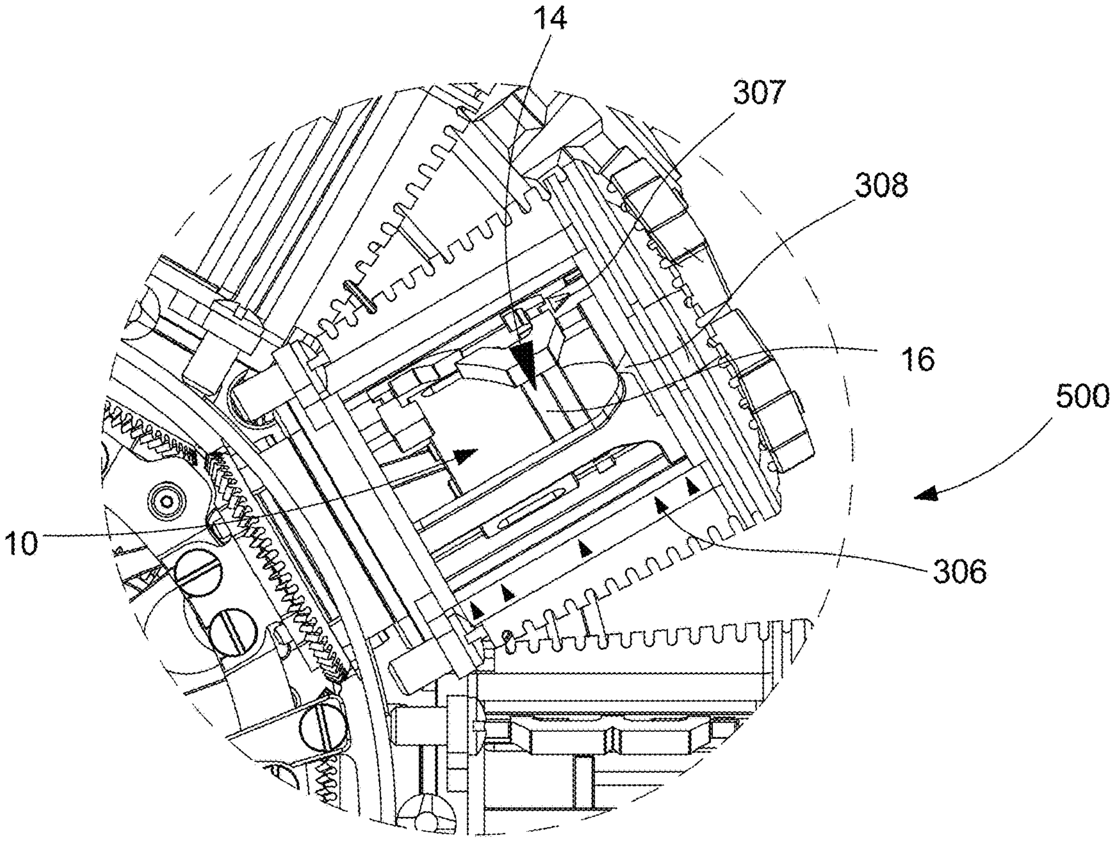
FIG. 10 shows an alternative embodiment wherein the structure of the cylinder has radially-spaced graduations for displaying each minute within a 5-minute interval, corresponding to the most off-centred end of the piston.
Figure 11:
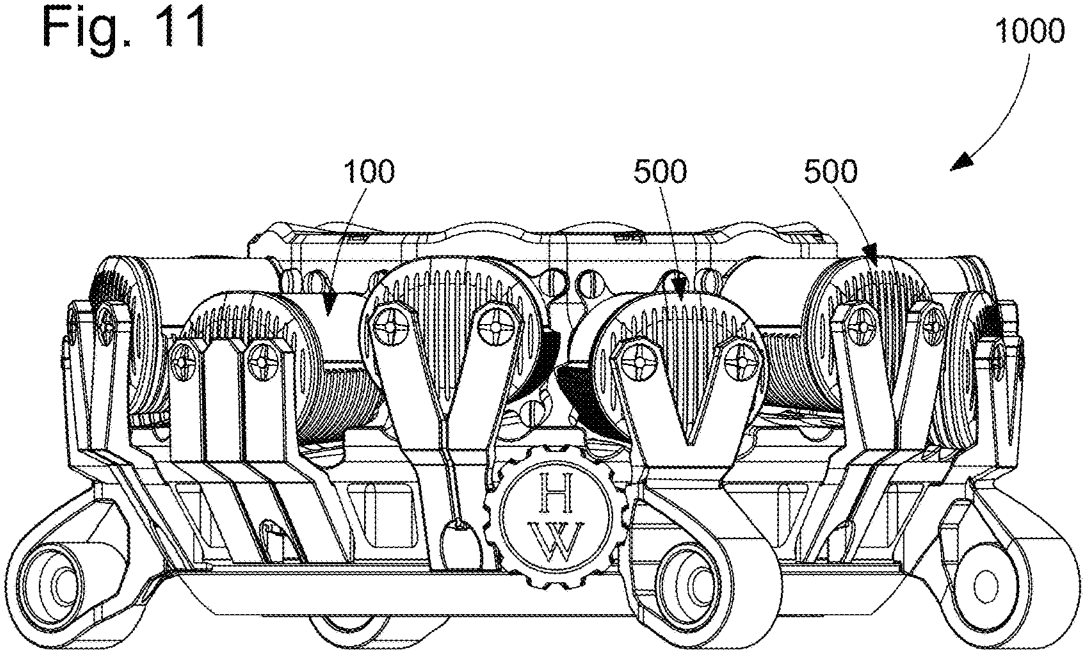
FIG. 11 is a side view of a timepiece, in this case a wristwatch, comprising the mechanism shown in FIG. 1, and showing the alternation on two parallel rows of two stars having six cylinders each.
Figure 12:
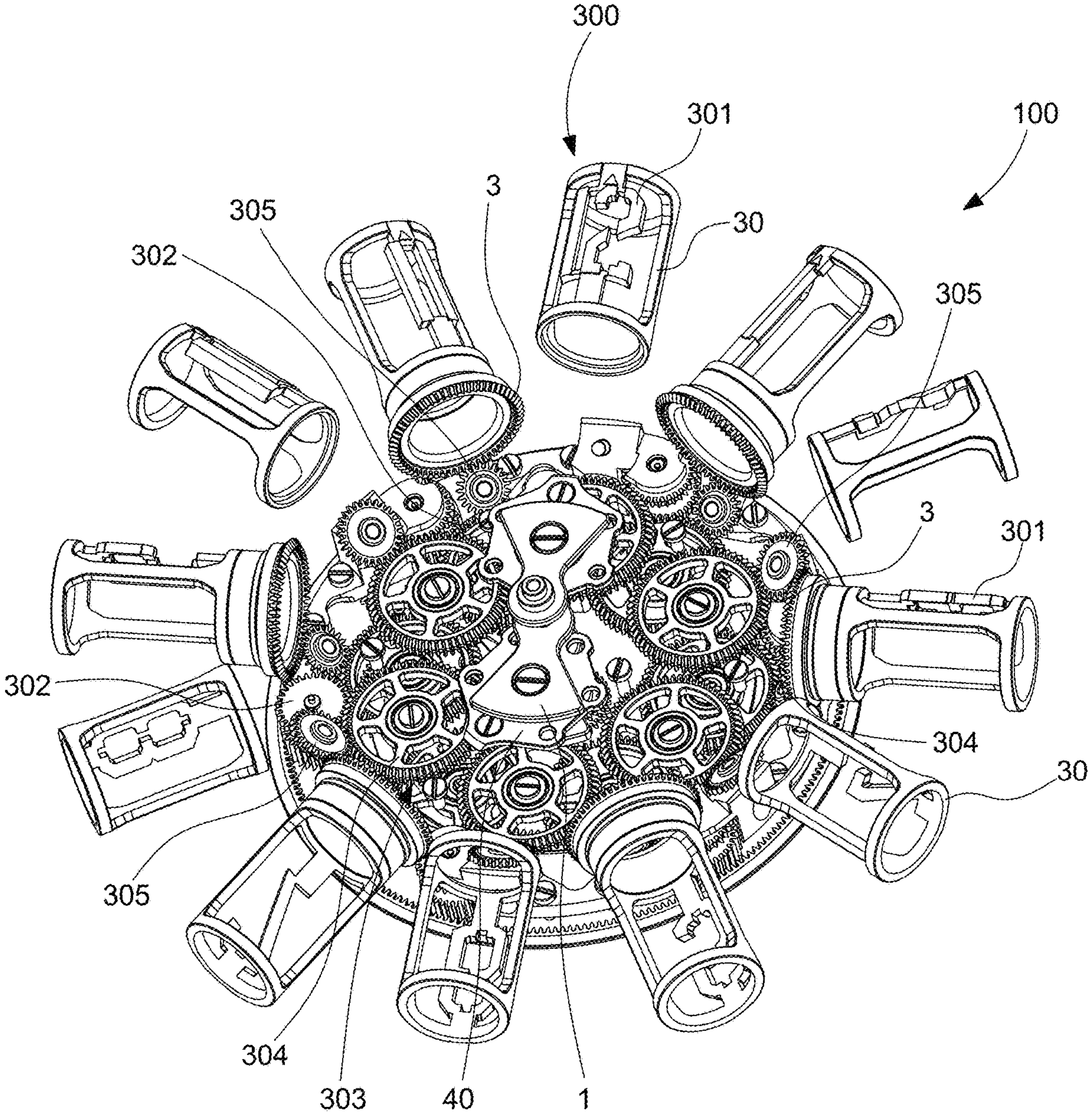
FIG. 12 diagrammatically shows a partially-exploded perspective and partial view of a part shown in FIG. 6, wherein the radial drive mechanism of the pistons can be seen in the centre, comprising a crankshaft to which the connecting rods, not shown, are articulated, on two superimposed stages, and at the periphery, the gear trains for rotating the hour digits in the cylinders.
Figure 13:
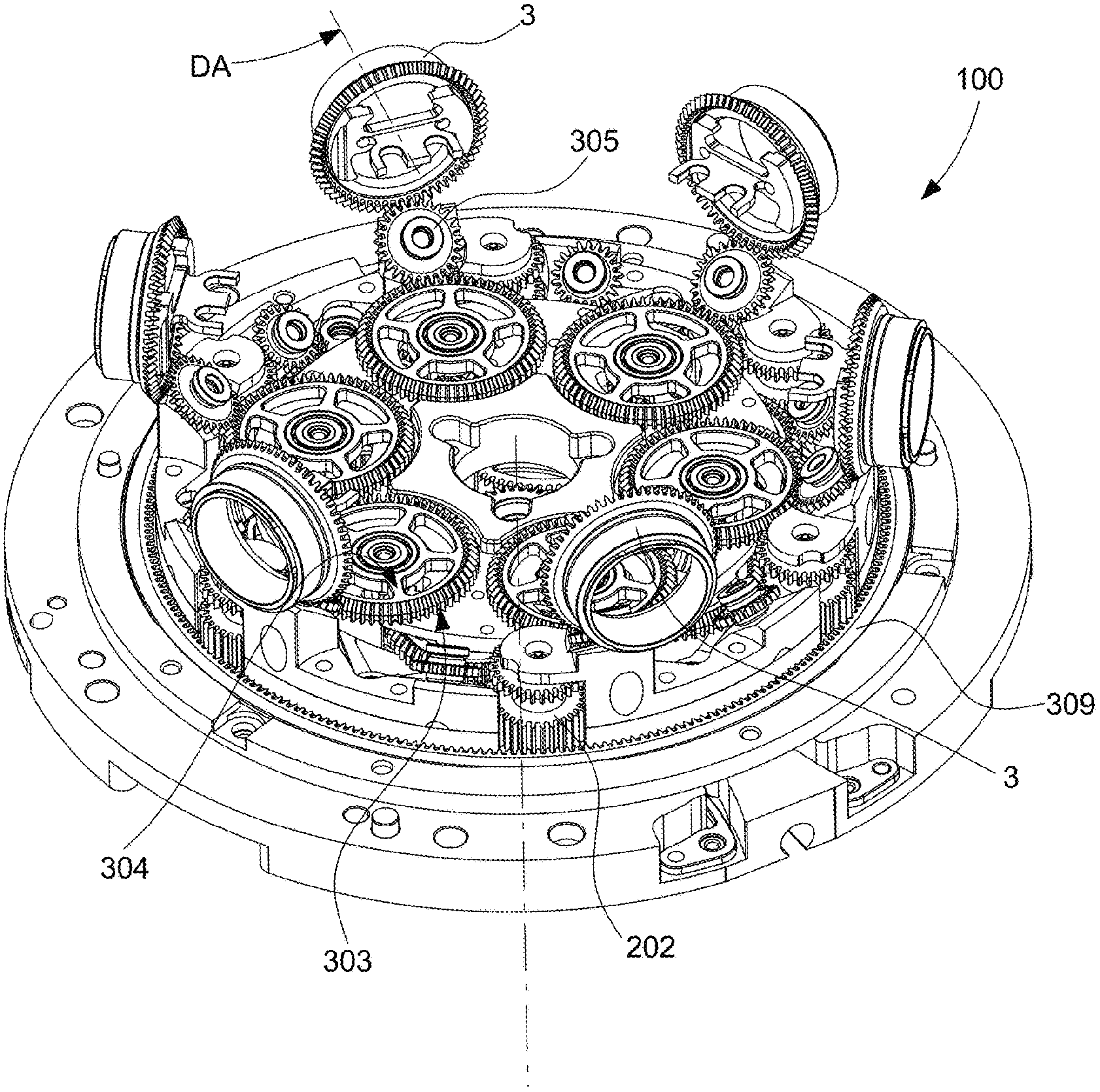
FIG. 13 is a magnified, detailed view of that shown in FIG. 12, showing only the gear trains for rotating the hour digits.
Figure 14:
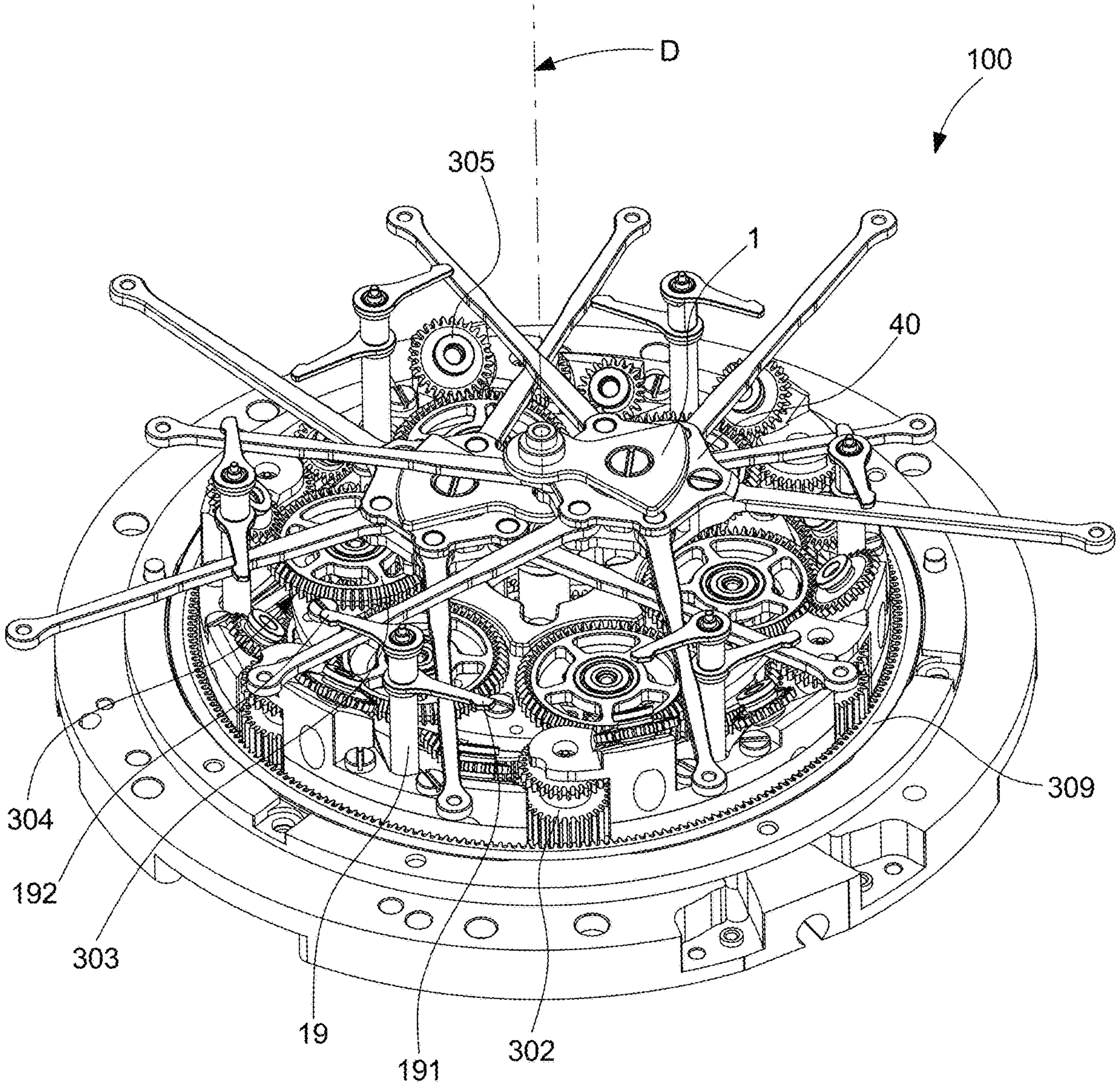
FIG. 14 is another detailed view of that shown in FIG. 6, showing the fixed and articulated connecting rods coming from the plates of the crankshaft; there are also six feelers, each intended to cooperate with two consecutive cylinders, to control the extension or retraction of the flap in relation to the piston: each feeler comprises two upper arms projecting from the upper part of a pillar parallel to the main axis of the movement, each intended to cooperate with a flap of a cylinder to be manoeuvred; the rotation of these feelers is controlled by a cam in the lower part, not visible in this figure, which cooperates with two lower arms forming a V-shape, which are integral with this pillar; this cam controls the motion of the feelers which penetrate the cylinders, and only one whereof controls, at a given moment in time, the elongation of the flap in relation to the piston in order to mark the cylinder thereof as an active cylinder for the minutes display.
Figure 15:
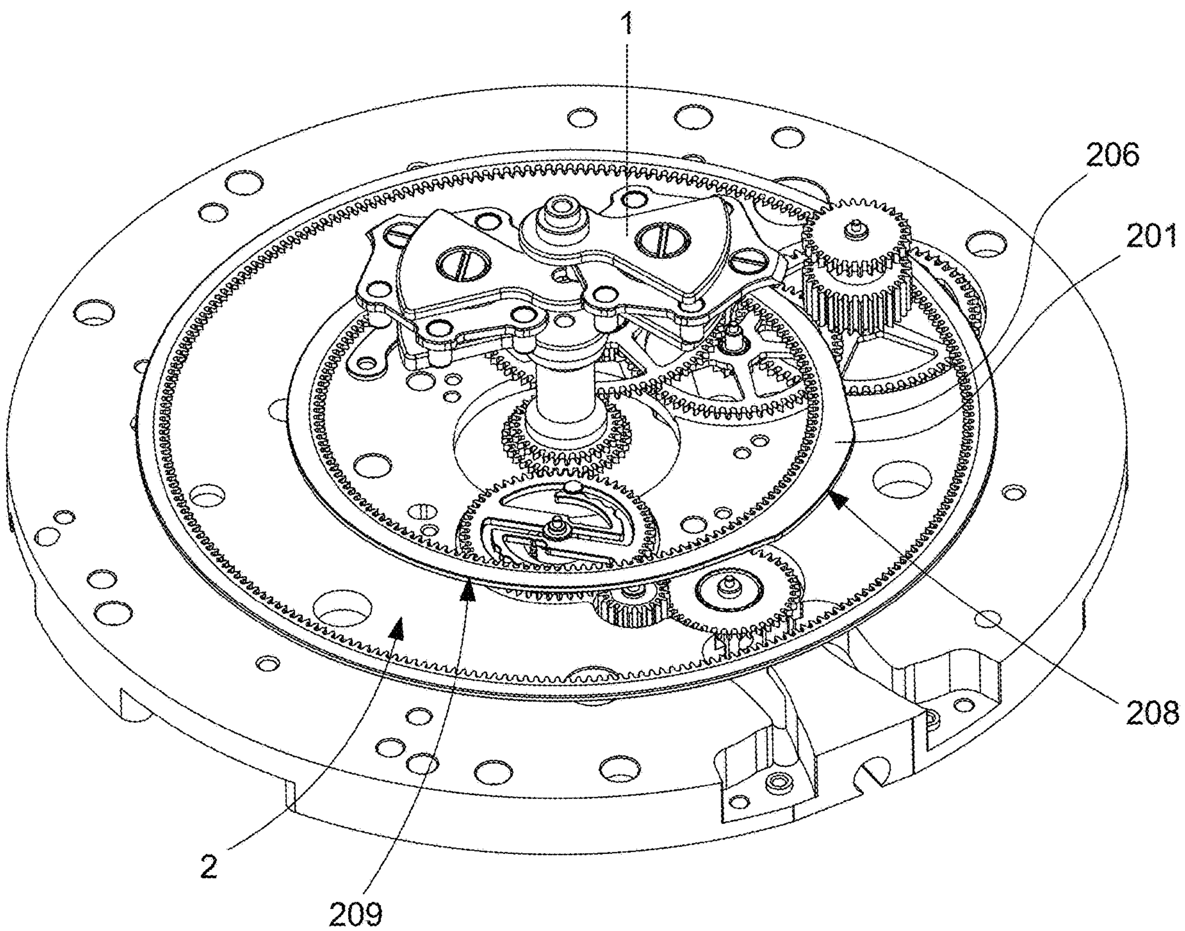
FIG. 15 shows, in a similar manner to FIG. 14, the lower part of the mechanism, wherein the cam for controlling the rotation of the feelers is visible, in this case integral with a moving minutes ring; in another alternative embodiment not shown, this cam can have limited angular mobility in relation to the moving minutes ring, in particular through the cooperation between a pin and an oblong opening in a sector of a circle.
Figure 16:
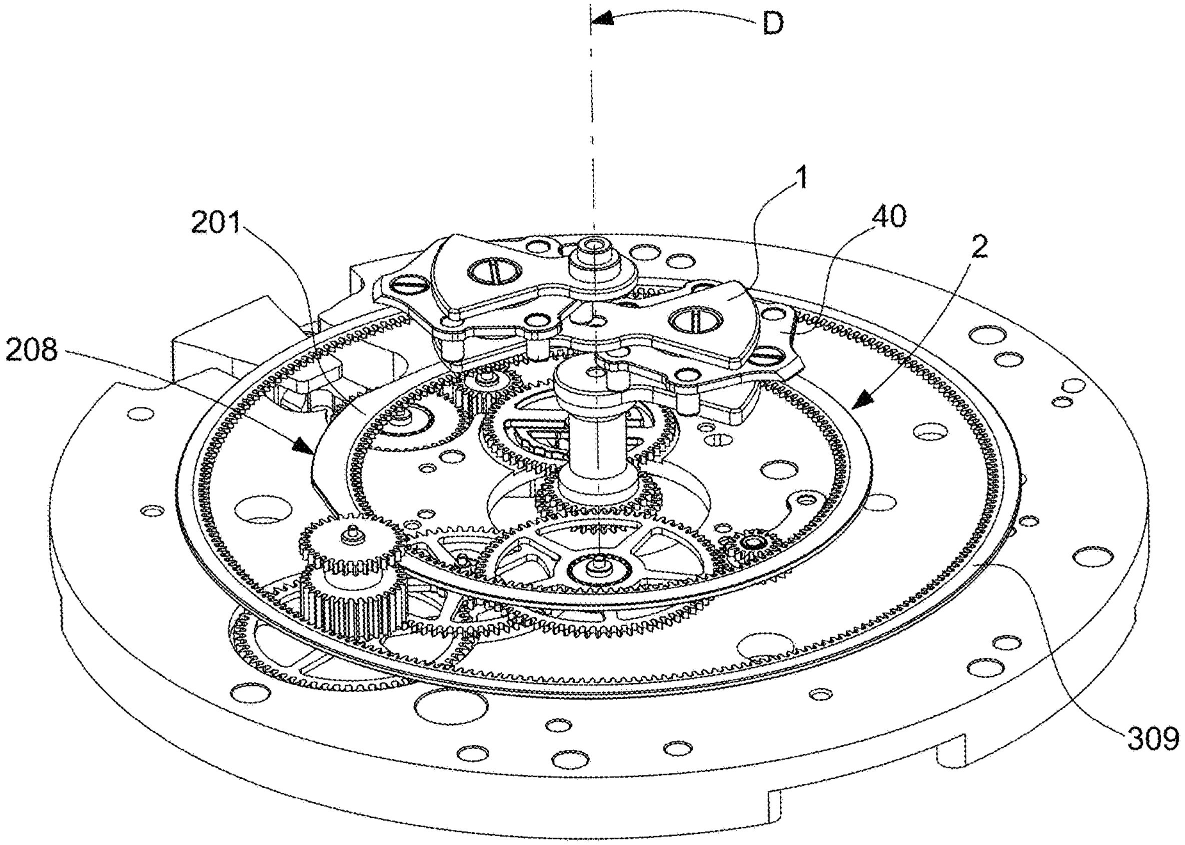
FIG. 16, which is similar to FIG. 15, shows the driving by the motion of a toothed ring synchronising the gear trains rotating the hour digits.
Figure 17:
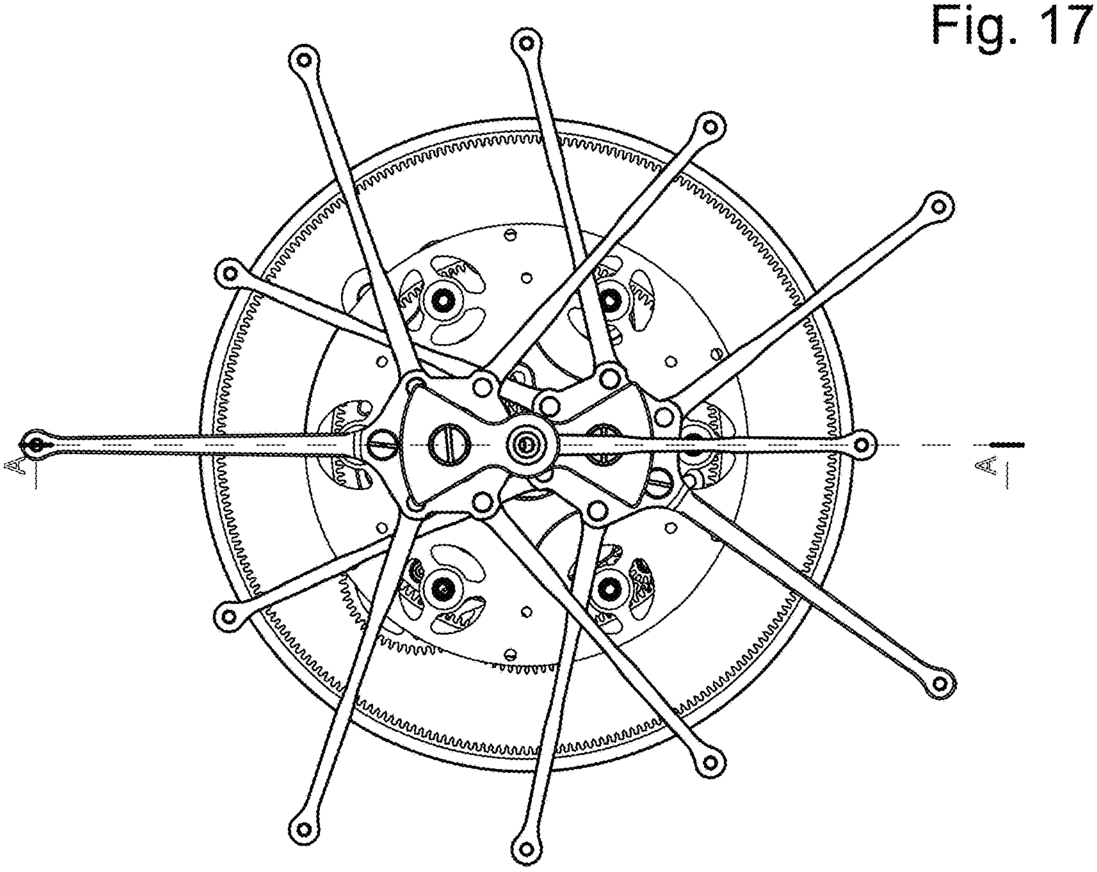
FIG. 17 is an overhead view of the connecting rod assembly for controlling the radial motion of the pistons.
Figure 18:
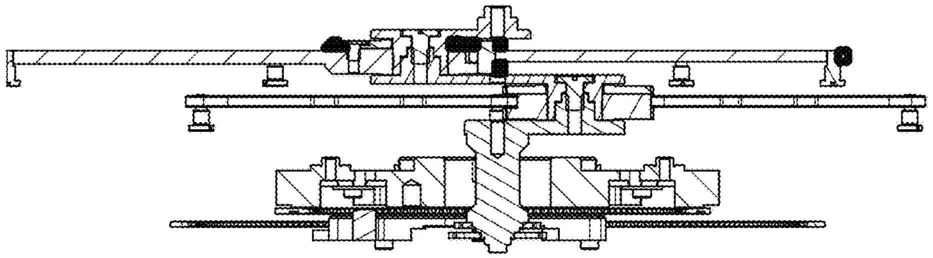
FIG. 18 is a sectional view of this connecting rod assembly, passing through the crankshaft axis and one of the fixed connecting rods.
Figure 19:
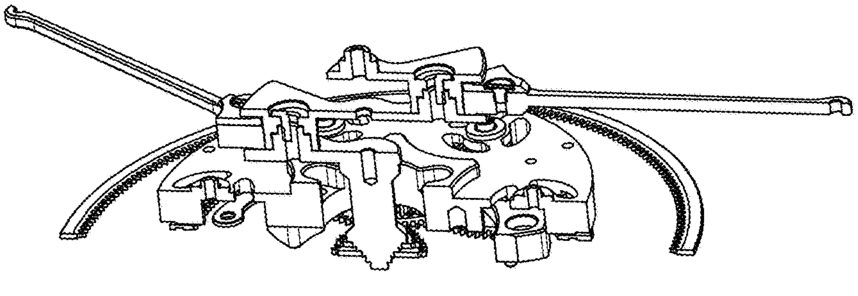
FIG. 19 is a perspective view, cut along a plane passing through the central axis, and partial view, of the crankshaft and of the plates thereof.
Figure 20:
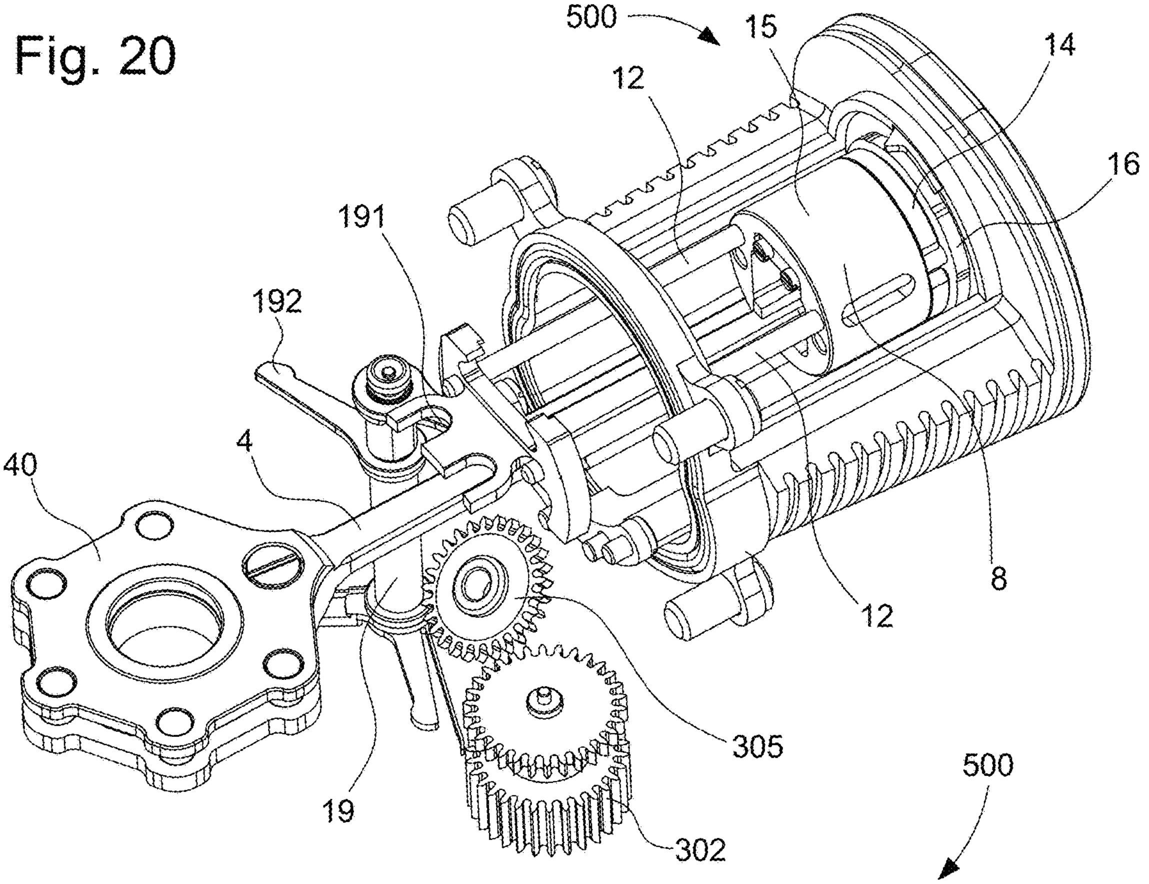
FIG. 20 is a diagrammatic, perspective view of a cylinder and of the elements controlling the rotation of the hour digit by a gear train, the radial translation of the piston by the motion of a connecting rod, and the radial translation of the flap by the rotation of the feeler; the piston is guided by two guide rods fixed to the structure of the watch case.
Figure 21:
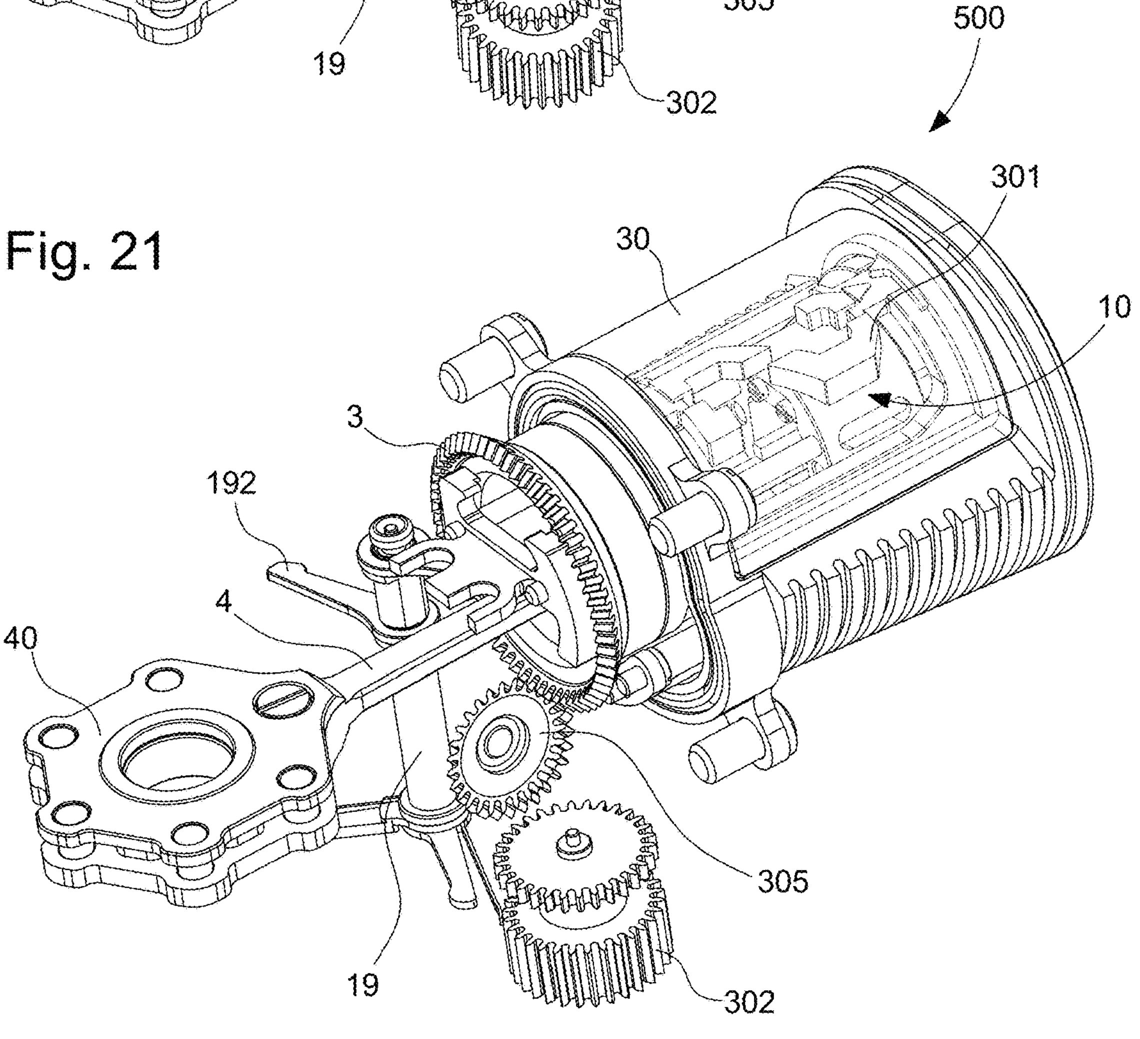
FIG. 21 is a view similar to that in FIG. 20, which shows, above and coaxially to the piston, the hour digit, itself positioned below a tubular hour body that is at least transparent facing the user when the watch is read from a frontal perspective; a feeler can be seen behind the connecting rod controlling the motion of the piston, said feeler having an axis parallel to that of the crankshaft, one upper arm whereof penetrates the cylinder to control the flap, the other upper arm being intended to cooperate with a nearby cylinder not shown; in the lower part, two lower arms are also shown, arranged in a V-shape, the tip on the axis of the pillar of the feeler, this V-shape being arranged to follow the large, substantially annular cam visible in FIGS. 15 and 16.
Figure 22:
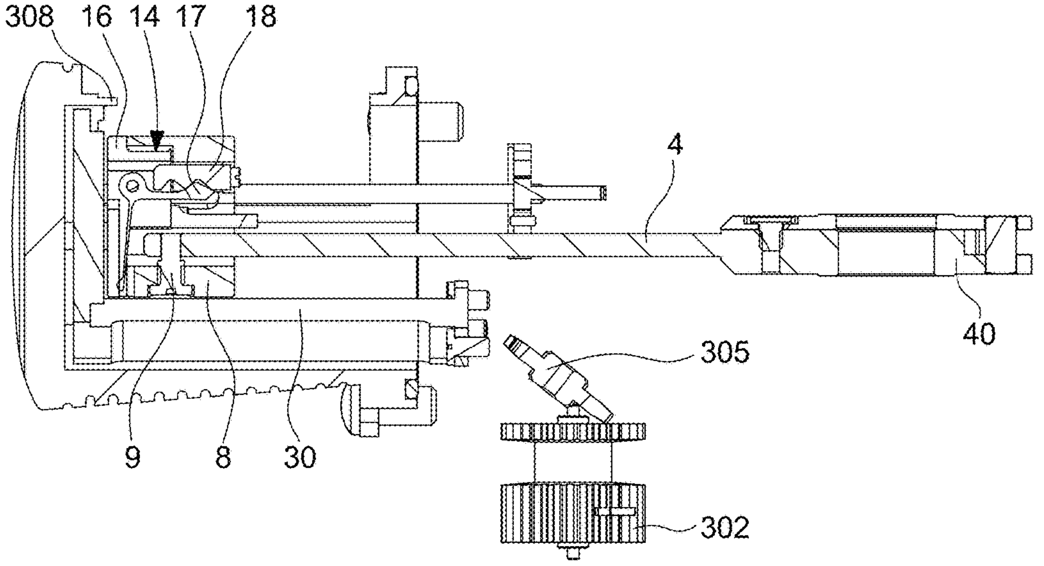
FIG. 22 is a sectional view, along a plane passing through the crankshaft axis, of the part of the mechanism shown in FIG. 20; it shows a right-angled jumper, pivoted at the apex of the right angle thereof, which cooperates with one of the notches of a hooking part integral with the flap, to hold it in one of the two positions thereof; in this case, the flap is in the retracted position, and the cylinder concerned does not display the current minutes.
Figure 23:
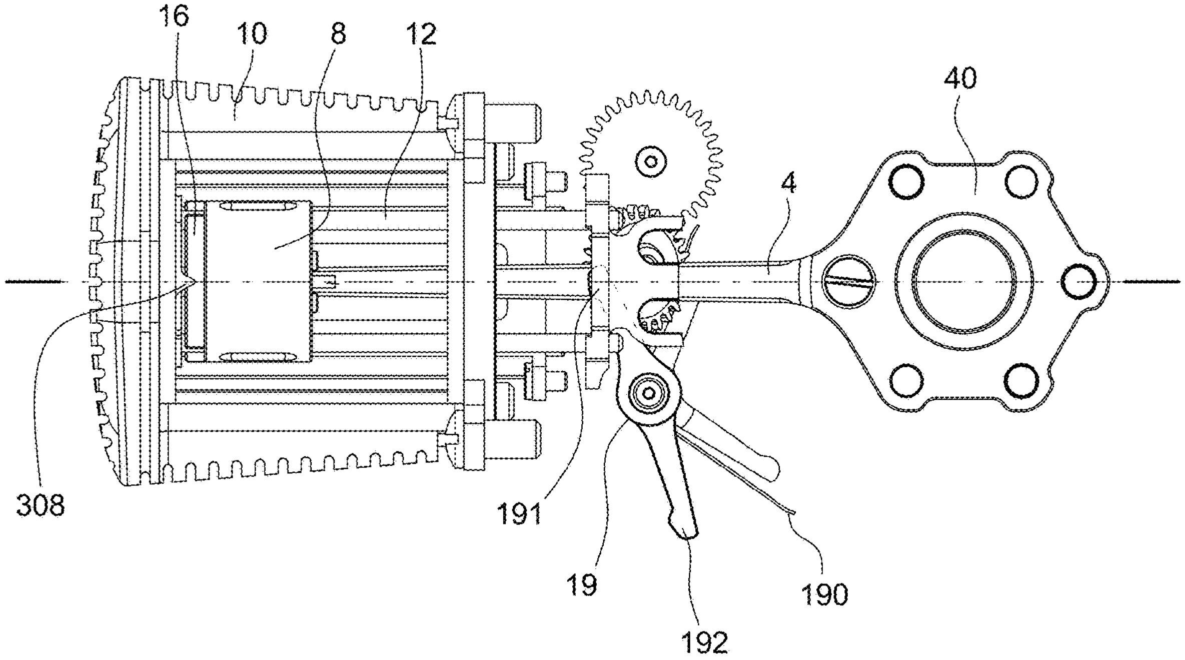
FIG. 23 is a view perpendicular to the crankshaft axis of the part of the mechanism shown in FIG. 20; in this case, the feeler is shown from an overhead view, showing the two upper arms thereof and the two lower arms thereof, which form a 120° V-shape.
Figure 24:
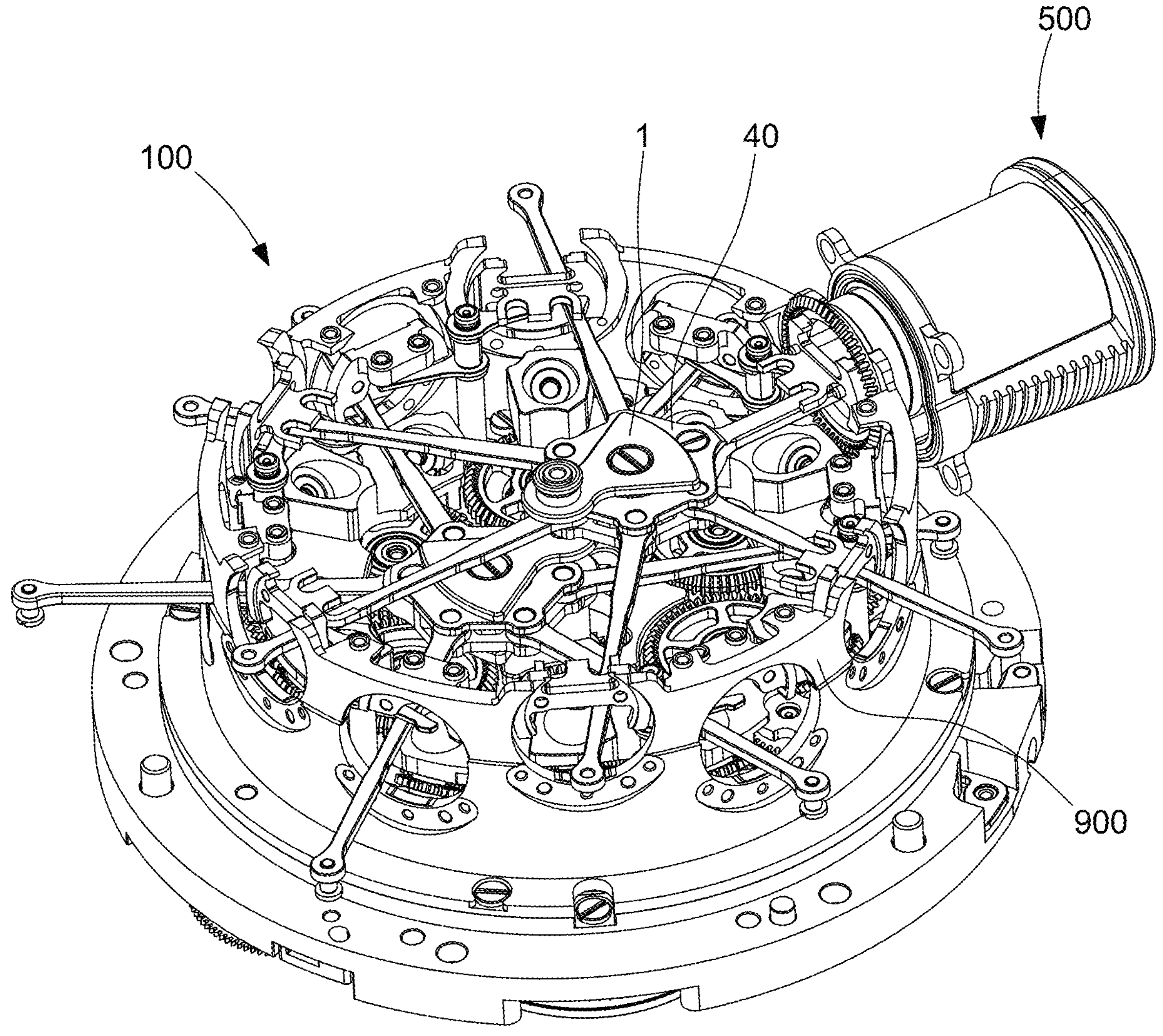
FIG. 24 is a view similar to that in FIG. 6, showing the supporting structure, with a single cylinder shown assembled in position; this structure can be the small plate of the movement, or an additional plate, or even the watch case.
Figure 25:
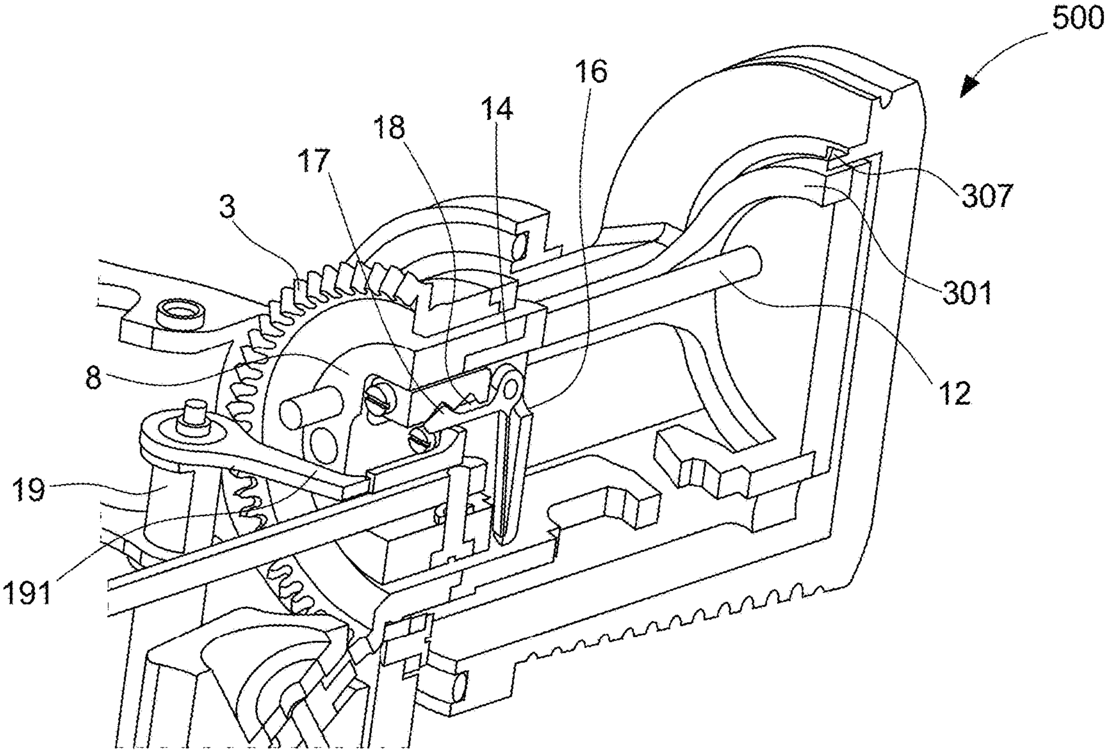
FIG. 25 is a diagrammatic, sectional, perspective view of a cylinder and of the elements for controlling the radial translation of the flap, from the control feeler to the holding jumper.

The invention relates to a timepiece, wherein the display of the variables is distributed among a plurality of entities, each activated at a particular moment in time.

In particular, the display of time variables is broken down into intervals, in particular into equal intervals. In particular, in order to display the hour, from among 12 or 24 entities, only one entity displays the current hour at a given moment in time. Rather than juxtaposing the different entities for different displays, the invention focuses on using the same entity to display two different horological variables, for example the hours and the minutes. The choice of 12 entities to display the hours entails the use of these same entities to display the minutes by way of 5-minute intervals. Any rational combination of integer multiples allows logical displays to be produced. Conversely, displaying the hour using 24 entities would logically entail the minutes to be displayed on each thereof in 2.5-minute intervals, which is not very practical, but may be sufficient for street furniture clocks or the like.

The invention thus relates to a horological display mechanism 100 for a timepiece 1000, in particular a watch, comprising at least one three-dimensional display support 10, which is arranged for the simultaneous display of at least a first variable on a first three-dimensional display 901 under the action of a first control mechanism, and of a second variable on a second three-dimensional display 902 under the action of a second control mechanism. Preferably, the first display 901 surrounds the second display 902, or vice-versa. According to an alternative embodiment, not shown, the first display 901 surrounds the second display 902 which are juxtaposed within the same display support 10.

According to the invention, the first control mechanism and the second control mechanism are capable of being manoeuvred independently of one another, and constitute separate mechanisms, one for controlling the translational motion and the other for controlling the rotational motion, or vice-versa.

More particularly, the display mechanism 100 comprises a plurality of such unit display supports 10. Moreover, at a given moment in time, only one first display 901 shows the actual value of the first variable, and only one second display 902 shows the actual value of the second variable.

The display mechanism 100 further comprises first optical means for informing the user which first display 901 shows the actual value of the first variable, and comprises second optical means for informing the user which second display 902 shows the actual value of the second variable.

According to a first viewing alternative embodiment, at each unit display support 10, the first display 901 or the second display 902 comprises, in order to determine the actual validity thereof, an optical indicator 14 which is visible to the user only when the display 901 or 902 bearing it displays the actual value of the variable displayed by this display 901 or 902. This display comprises a flap 16, which is capable of moving between an activated position wherein the flap 16 reveals the optical indicator 14 and a deactivated position wherein the flap 16 conceals the optical indicator 14 from the user. The display mechanism 100 comprises an actuator 2, which is arranged to control the manoeuvring, into the activated position, of the flap 16 at only one unit display support 10 at a time, and to control, at the same moment in time, the switching into the deactivated position or the holding in the deactivated position of the flaps 16 of all of the other unit display supports 10. The purpose of this flap 16 in this case is to show the user which display is valid at a given moment in time; the alternative embodiment shown more particularly indicates which five-minute interval is currently applicable at the considered moment in time. However, it goes without saying that such a flap can constitute in itself a third or a fourth display, for displaying a complementary indication such as day/night, AM/PM, a time zone, or other indication.

According to a second viewing alternative embodiment, at each unit display support 10, the first display 901 or the second display 902 comprises, in order to determine the actual validity thereof, a dynamic index 307, which is capable of moving in relation to a static index 308 borne by a fixed part of the display mechanism 100. This dynamic index 307 and this static index 308 are arranged to come into alignment or to be superimposed, when the display 901 or 902 bearing it displays the actual value of the variable displayed by this display 901 or 902.

More particularly, the display mechanism 100 comprises a plurality of separate unit display supports 10 on which the display of at least a first variable and/or a second variable is broken down by splitting it into separate ranges. More particularly, these separate unit display supports 10 comprise identical mechanical components, only the elements specific to the display being liable to differ from one another; they are referred to herein as "similar" unit display supports 10.

More particularly, all of the unit display supports 10 comprise display indicators of the same kind, which are either first displays 901 for displaying a first variable, or second displays 902 for displaying a second variable, or both first displays 901 and second displays 902. All of the display indicators are arranged such that they are visible to the user of the timepiece 1000, and the display mechanism 100 comprises a control mechanism 300, which is arranged to drive wheels or rod systems for driving the different display wheel sets comprised in the display mechanism 100. This control mechanism 300 comprises a first carrier 111, arranged to be driven by a horological movement 200 and to drive by itself all of the first displays 901 when comprised therein, and/or comprises a second carrier 112, arranged to be driven by a horological movement 200 and to drive by itself all of the second displays 902 when comprised therein.

More particularly, the display mechanism 100 comprises, in each unit display support 10, at least one first display 901 and one second display 902, which are coaxial to one another.

More particularly, the actuator 2 comprises a cam which is arranged to control, directly or indirectly through at least one two-armed lever, the stroke of at least one feeler 19 in order to push a flap 16 along a linear stroke, this feeler 19 being brought back towards the cam 2 such that it bears thereagainst by elastic return means 190 or 497.

More particularly, the display 901 or 902, which comprises an optical indicator 14 and a flap 16, comprises a moving support or a piston 8, relative whereto the flap 16 is capable of moving between the activated position wherein the flap 16 reveals the optical indicator 14 and the deactivated position wherein the flap 16 conceals the optical indicator 14 from the user. This optical indicator 14 is in particular, but in a non-limiting manner, borne by the moving support or piston 8 or by the flap 16.

More particularly, the flap 16 is capable of moving linearly between an activated position and a deactivated position relative to the moving support or piston 8, which is itself capable of moving linearly in the same direction between two stroke end positions.

More particularly, each first display 901 is animated by a periodic motion, and each second display 902 is animated by a periodic motion, and the pitch of one of the two is an integer multiple of the pitch of the other, or vice-versa.

More particularly, the display mechanism 100 comprises a single unit display support 10, and the first display 901 and the second display 902 are arranged to display the hours and the minutes, or to display the minutes and the seconds. For example, this mechanism can take the shape of a single-cylinder engine comprising a rotating, wandering jacket and a piston undergoing an alternating motion, each constituting one of the displays.

More particularly, the display mechanism 100 comprises a plurality of similar unit display supports 10, each first display 901 being arranged to display a limited amplitude range which is an integer submultiple of the total display range of the first variable, and each second display 902 being arranged to display a limited amplitude range which is an integer submultiple of the total display range of the second variable.

The invention further relates to a timepiece 1000, in particular a watch, comprising a horological movement 200 arranged to drive at least one such display mechanism 100. More particularly, this display mechanism 100 comprises a control mechanism 300 which comprises at least one first carrier 111, arranged to be driven by a wheel set of the horological movement 200, in particular a minute wheel set, and/or a second carrier 112, arranged to be driven by a wheel set of the horological movement 200, in particular an hour wheel set, in order to directly or indirectly drive each first display 901 and each second display 902.

The invention is illustrated herein, in the figures, through a non-limiting alternative embodiment, in the form of a timepiece 1000, which in this case is a wristwatch, in the shape of a two-row aircraft engine, and which comprises such a display mechanism 100, and wherein the display of:

- the hours is produced by means of machined hour bodies 30, actuated by a gear train;
- the minutes is produced by means of pistons 8 actuated by a connecting rod assembly comprising at least one crankshaft 1 and connecting rods 4 and 5.

This horological display mechanism 100 comprises a plurality of separate unit display supports 10, each extending in a direction parallel to or coincident with a radial basic axis DA, and all distributed about a central axis D. The basic axis DA is in particular a radial axis, perpendicular to the central axis D, or is a direction parallel to such a radial axis. The timepiece 1000 takes the shape of an aircraft engine in the shape of a star, or a double star, each radial cylinder enclosing, in this case, in a non-limiting manner, a unit display support 10.

This display mechanism 100 is arranged to display the value of at least one variable on the plurality of unit display supports 10.

More particularly, each unit display support 10 is a substantially cylindrical body, extending radially relative to the central axis D about a structure 900, and which is projecting radially from the structure 900.

This unit display support 10 encloses at least one indicator for displaying the value of a variable, which display indicator is either a first display 901 capable of moving in translation along the basic axis DA thereof, or a second display 902 capable of moving in rotation about the basic axis DA thereof.

More particularly, the first display 901 and the second display 902 are either both capable of moving in translation in a direction parallel to or coincident with a radial basic axis DA which is perpendicular to the central axis D, or both capable of moving in coaxial rotation relative to a direction parallel to or coincident with such a radial basic axis DA, or one of the first display 901 and second display 902 is capable of moving in translation in a direction parallel to or coincident with such a radial basic axis DA and the other of this first display 901 and this second display 902 is capable of moving in rotation relative to a direction parallel to or coincident with such a radial basic axis DA.

According to an advantageous alternative embodiment of the invention, all of the unit display supports 10 are similar, and comprise display indicators of the same kind, which are either first displays 901 for displaying a first variable, or second displays 902 for displaying a second variable, or both first displays 901 and second displays 902. More particularly, the display indicators 901, 902, are substantially axisymmetric, in particular cylindrical in shape.

Moreover, the display mechanism 100 comprises a control mechanism 300, which is arranged to drive, about the common axis D, wheels or rod systems for driving the different display wheel sets comprised in the display mechanism 100.

More particularly, the display mechanism 100 comprises a first display 901 in each unit display support 10, and each first display 901 comprises a first optical indicator 14, which is concealed or otherwise by a flap 16 which is capable of moving linearly in the direction of the basic axis DA, between an activated position and a deactivated position, in order to validate or respectively invalidate a value of the first variable.

Moreover, the control mechanism 300 comprises a first actuator which is arranged to control, at a single unit display support 10 at a time, the switching into the activated position, or the holding in the activated position, of the flap 16, and to control, at the same moment in time, the switching into the deactivated position or respectively the holding in the deactivated position of the flaps 16 of all of the other unit display supports 10.

More particularly, this first actuator comprises a cam 2 which controls, directly or indirectly through at least one two-armed lever, the stroke of at least one feeler 19 in order to push, along a linear stroke, such a flap 16 which is arranged to conceal or to reveal a first optical indicator 14. Advantageously, this cam 2 is very simple, is flat, and comprises, relative to an annular structure, a protrusion 201 concentric to this annular structure, and projecting radially outwards, connected by two shelved ramps 206.

Figure 26:
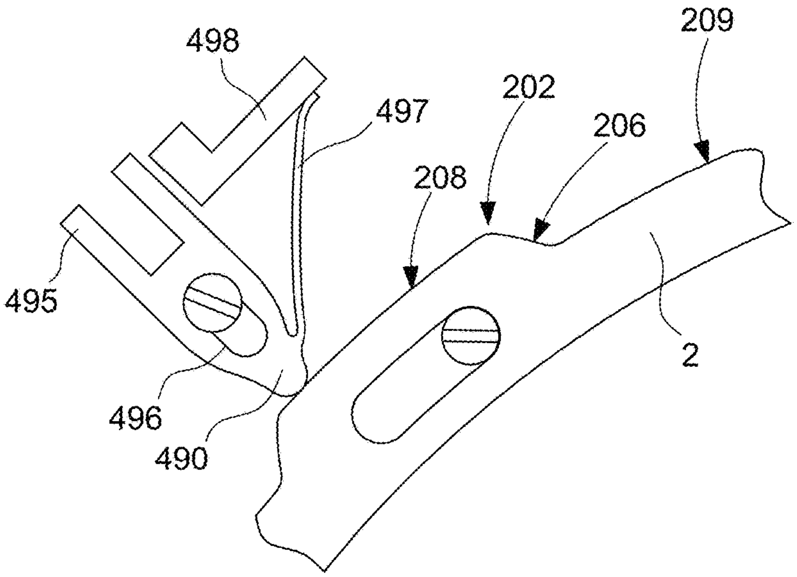
FIG. 26 shows an alternative embodiment wherein the pivoting feeler is replaced by a feeler having a substantially radial stroke in relation to the cam, against which it is pressed by a jumper bearing against the structure of the watch.

In the alternative embodiment shown in FIG. 26, the feeler 19 comprises a rectilinear foot 490, which comprises an oblong guide slot 496 about a stepped screw directly bearing against the cam tracks extending along the edge of the cam 2: upper edge 208, lower edge 209, and ramps 206, and the U-shaped part 495, located the furthest from the centre of cam 2, directly controls the flap 16.

According to another alternative embodiment illustrated by all of the other figures, the feeler 19, which comprises, at the upper end of a pillar, a first upper arm 191 for controlling the flap 16 of a first cylinder, and a second upper arm 192 for controlling the flap 16 of a second cylinder, is controlled such that it rotates by a lever pivoting at the lower part of this pillar, and which comprises two lower arms, which jointly form a V-shape which bears against the periphery of the cam 2 and follows this periphery; this lever pivots in a first direction when going up on the protrusion, then in the other direction when going back down. In the example shown, the cam 2 drives the minutes and makes one revolution per hour.

More particularly, the feeler 19 comprises at least one elastic arm 190, or 497, depending on the alternative embodiment, which is arranged to bear against the structure 900, or 498, and which tends to repel the feeler 19 towards the cam 2.

The flap 16 is capable of moving in translation parallel to a direction parallel to or coincident with a radial basic axis DA, or is capable of moving in rotation relative to a direction parallel to or coincident with a radial basic axis DA.

More particularly, each flap 16 is capable of moving linearly between an activated position and a deactivated position relative to a moving support 8 comprised in the first display 901, and which is itself capable of moving linearly in the same direction as the basic axis DA, between two stroke end positions. More particularly, each moving support 8 is a piston, which is capable of moving linearly between the two stroke end positions thereof with a periodic motion.

More particularly, the first display 901 comprises a jumper 17, in particular in the form of a right-angle, which is arranged to hold the flap 16, in the engaged position, against a hooking part 18 which is fixed to the moving support 8, or piston, in particular at a notch, and to allow the release thereof when the feeler 19 recoils and the moving support 8 reverses direction.

More particularly, the display mechanism 100 comprises a first display 901 in each unit display support 10, and the first carrier 111 comprises a crankshaft 1, which is arranged to be driven by a horological movement 200. At least one crank pin 41 of this crankshaft 1 drives at least one plate 40, which bears fixed 4, or articulated 5 connecting rods, each arranged to move a first display 901 according to an alternating, linear to-and-fro motion.

According to an alternative embodiment, not shown, the display mechanism 100 comprises a second display 902 in each unit display support 10, and each second display 902 comprises a second optical indicator which is capable of moving linearly in the direction of the basic axis DA between an activated position and a deactivated position, in order to determine a value of the second variable, and the control mechanism 300 comprises a second actuator which is arranged to control, at a single unit display support 10 at a time, the switching into the activated position or the holding in the activated position of the second optical indicator, and to control, at the same moment in time, the switching into the deactivated position or respectively the holding in the deactivated position, of the second optical indicators of all of the other unit display supports 10.

More particularly, the display mechanism 100 comprises a second display 902 in each unit display support 10.

In the alternative embodiment shown, the second display 902 comprises a tubular body 30, which bears at least one identification marking and which comprises at least one cut-out and/or transparent surface to reveal to the user any component comprised in the display mechanism 100 housed inside the tubular body 30.

In the alternative embodiment shown, the control mechanism 300 comprises a gear train with reduction mechanisms to drive all of the second displays 902 synchronously.

More particularly, each unit display support 10 comprises a chamber, which is sealed to the external environment of the timepiece 1000 bearing the display mechanism 100, and inside which each display indicator 901, 902 is capable of moving.

According to one specific embodiment as shown in the figures, the structure 900 is an additional plate arranged to be placed above a horological movement 200.

According to another alternative embodiment, the structure 900 is the middle or the case of the timepiece 1000 enclosing a horological movement 200.

More specifically, the display mechanism 100, or the horological movement 200, comprises, at the interface between the display mechanism 100 and the horological movement 200, an adjustable friction wheel set engaged on the movement 200 to enable the display mechanism 100 to be adjusted, in particular the time to be set, by the winding and setting stem of the movement 200.

Although the invention is described here for the specific case of a timepiece 1000 which produces circular-type displays centred about the central axis D of a horological movement 200, it can nonetheless be produced for other types of display, for example linear displays.

Similarly, although the invention is described for a mechanism of the continuous type, carrying out one revolution around the dial, it can also be adapted to displays of the retrograde type.

According to the alternative embodiment shown in the figures, the timepiece 1000 takes the overall shape of a star-, or more specifically a double star-shaped two-row aircraft engine with two stages of cylinders 10, which are radial relative to a central axis D, and axially offset in order to cooperate with two stages of the crankshaft 1, like the famous "Pratt & Whitney® R-2800" 18-cylinder two-row aircraft engine. These cylinders 10 are fixed on a structure 900 and surround it. This structure 900 can be the middle or the case of the timepiece, or an element mounted on this middle or on this case such as an additional plate, and the cylinders 10 can be radially projecting from this structure, as shown.

It goes without saying that this timepiece 1000 can also take the shape of a single star, with all the cylinders in the same plane. The specific and non-limiting choice of a multi-row star display is primarily intended to simplify the connecting rod assembly distributing the motion in the cylinders, while limiting the diameter of the timepiece to a reasonable size.

Each cylinder 10 comprises a transparent part, consisting of a casing 20, through which the user can see at least one display wheel set. Depending on the chosen configuration, these wheel sets can be solid, perforated, or transparent and can bear a marking. The number of cylinders chosen depends on the desired application: mention can be made, by way of a non-limiting example, of three, six, twelve or twenty-four for the hour display, six, ten, twelve or fifteen for the minutes or seconds display, seven for the day-of-the-week display, three, four, six or twelve for the month display, four, six, eight or twelve for the date display, and four for the simple or leap year display, the only limits being those of the complexity and volume of the mechanism associated with the chosen complication.

More particularly, in this embodiment shown in the figures, the hours are displayed by means of indexes comprised in twelve rotating hour bodies 30, each housed in a cylinder 10 (six per stage in this specific embodiment), with each of the indexes revolving once every 12 hours. Moreover, another display of the minutes, in five-minute intervals, is produced by twelve pistons 8, which circulate linearly in the twelve hour bodies 30, with the indication of the current 5-minute interval by means of an optical indicator 14, made visible by a flap 16 open at the piston 8 concerned, and easily visible to the user.

The hours are thus displayed on substantially cylindrical hour bodies 30 housed in the cylinders 10. These hour bodies 30 can comprise cut cylindrical metal carriages or the like, or tubes made of a transparent material, in particular sapphire or the like, bearing a marking, by metallisation, laser etching or the like, with the one or more corresponding hour digits 301; the movement 200 of the timepiece 1000 drives each hour body 30, carriage or tube so as to carry out two revolutions every 24 hours.

Each cylinder 10 comprises a sealed casing 20 for receiving this hour body 30 which surrounds a piston 8; this casing 20 is transparent on at least one side visible to the user of the watch for reading the time, and is for example made of sapphire or the like. This cylinder 10 can either be mounted on the structure 900 or the middle of the watch, or form a part of this structure 900 or this middle or of the case of the watch. The cylinder 10 whose legible encrypted inscription on the hour body 30 thereof directly faces the user, is the active cylinder that provides the display of the current hour.

Advantageously, this cylinder 10, which is active for displaying the hour, is visually materialised by the highly-visible matching of a dynamic index 307 borne by the hour body 30, and of a static index 308 borne by the cylinder 10, the supporting structure 900, the middle, or the case.

This match can be a visual match; it can also be mechanical, electrical or magnetic, in order to show an active hour cylinder indicator. For example, in one mechanical alternative embodiment, the hour body 30 can comprise, on the side of the structure 900, a lug, or a notch, or a cam, in order to cooperate with a lever housed in the structure 900 in line with the cylinder, the pivoting whereof causes a flag to appear in an aperture, as disclosed in the European patent document EP2595006 filed by BLANCPAIN SA, or the like. In one magnetic alternative embodiment, the cooperation of magnets of the same or opposite polarity, borne by the hour body 30 and the structure 900, also enables such a flag to be controlled. In an electro-mechanical timepiece, an electrical contact in alignment with the indexes of the hour body 30 and the structure 900 allows a lighting function, or other function to be controlled.

Similarly, from among the various cylinders 10, only one cylinder 10 is active at any given moment in time to display the minutes. The cylinder 10 that is active for displaying a 5-minute interval is displayed by highlighting an optical indicator 14, in particular by highlighting the opening of the flap 16, for example located at the distal end of the piston 8, opposite the connecting rod assembly, visible by a highly-visible coloured mark, for example a red or similar coloured surface 140; it is understood that this flap 16 is, at a given moment in time, open at only one cylinder 10, and closed over all the others; at the end of a 5-minute interval, the flap 16 closes over the piston 8 of the cylinder 10 which has just displayed the minutes, and opens over the piston 8 of the next cylinder 10, preferably in a clockwise direction;

In a specific alternative embodiment, the current minute is displayed, in each 5-minute interval, by means of graduations 306 borne by the cylinders 10, or by the casings 20, or by the hour bodies 30; these graduations 306 can be equidistant, or in this case, non-linear, since they depend on the connecting rod assembly kinematics used; a mark on the piston 8, or the distal end of the piston 8, or the coloured mark 140 on the flap 16, is easy to read opposite this graduated scale.

The embodiment shown represents a good compromise between legibility, aesthetics and the space available for housing the different mechanisms. In this specific but non-limiting case, it comprises:

- a conical-toothed gear train, actuated by the movement 200 of the watch 1000, and arranged to drive the hour bodies 30 in rotation;
- at least one central crankshaft 1, arranged to actuate the pistons 8 according to a to-and-fro translational motion in the respective hour bodies 30 thereof;
- a piston flap 16 release mechanism, revealing a coloured mark 140 on the piston 8 concerned by the current minute interval, thus improving the ease of reading the time.

More particularly, the hour display comprises an hour body 30 which is a metal component with cut hour digits 301, which improves visibility and legibility.

The connecting rod assembly is inevitably complex, due to the number of the twelve wheel sets to be controlled in this specific case. While a crankshaft plate with twelve connecting rods is conceivable, the overall dimensions and fragility of the mechanism mean that solutions with a plurality of crankshaft plates 40 each driving a sub-multiple of 12 are preferred: the version shown comprises two superimposed crankshaft plates 40, each capable of controlling six pistons, with the release mechanism thereof allowing differentiation of the piston 8 displaying the current minute.

A power source that has been sufficiently dimensioned for a large watch must be provided, for example with a fitting diameter of about 43 mm and an overall diameter of about 53 mm at the cylinder heads, with cylinders that are large enough to be clearly visible, with a height of 10 to 12 mm and a diameter of 8 to 12 mm, to guarantee a sufficient power reserve, greater than 50 hours. More specifically, the torque on the crankshaft is equal to about 3 N·mm. A plurality of barrels are thus installed, for example each having a capacity of 8 or 9 N·mm: a configuration with four such barrels in parallel allows a high moment of force to be delivered, with such a power reserve. Other alternative embodiments are possible, in particular but not limited to two pairs of barrels in series, placed in parallel to increase the power reserve, or three barrels to save space.

The movement 200 transfers energy, via gear trains, to an output wheel set of the movement which drives the crankshaft 1, a minutes release cam 2, and the hour pinions 3.

The crankshaft 1 is a key component, both as regards the distribution function and the visual impact thereof. Due to its many functions, a component of extreme precision is required, which is why it is advantageous to have a one-piece component, in particular guided between a stone on the one hand and a screwed bearing on the other hand. This arrangement limits the risks of positioning errors caused by overhang and those caused by the accumulation of tolerances in an assembly, and also makes the component more reliable in order to maintain the high precision thereof over the long term.

In the version shown comprising two crankshaft plates 40, these two plates 40 each pivot about a crank pin 41 of the crankshaft 1, and each bears six connecting rods, one whereof can be integral with the plate to form therewith a large fixed connecting rod 4; the other small articulated connecting rods 5 pivot on plate pins 7 driven into the plate 40. The rotation of the large connecting rod must be as fluid as possible. A shock-absorbing hub 6 is advantageously placed between the crankshaft pin 41 and the associated plate 40. A galvanic treatment of the Nickel PTFE type procures a pivot point with good anti-seize and self-lubricating features; the static coefficient of friction can thus be lowered to 0.15, and the dynamic coefficient of friction can be lowered to 0.10. The same galvanic treatment is also advantageously applied to the connecting rod-pin connections.

Each connecting rod 4, 5, penetrates the interior of a piston 8, which comprises, in a radial bore, a fixing pin 9 about which the connecting rod thereof pivots. The piston 8 must work freely about a degree of freedom perpendicular to the connecting rod considered; to this end, the piston 8 comprises an opening, for the passage of this connecting rod, that is large enough to allow the maximum working angles of the connecting rod. The fixing pin 9 is hard to reach for maintenance, and the piston 8 moves in an area highly visible to the user, so it is preferable to avoid any liquid lubrication causing at least visual pollution: the connection between the fixing pin 9 and the respective connecting rod thereof is preferably also treated with a galvanic treatment of the Nickel PTFE or similar type.

The piston 8 must have the best possible guidance, that is both precise and very smooth to prevent any risk of seizure and jamming of the mechanism.

Among the possible solutions, the figures show the piston 8 being guided by two rods 12, in this case placed, in a non-limiting manner, inside a sapphire cylindrical tube 20. The piston 8 comprises two lateral notches 81 for receiving intermediate guides 13, or buffer pieces, which guide the rods 12 in a sliding manner. A galvanic treatment of the Nickel PTFE or similar type is also advantageous in this case in order to reduce the coefficient of friction and procure a self-lubricating contact. The intermediate guides 13 are preferably substantially diametrically opposed, which ensures optimum distancing and good guidance of the piston 8 on these rods 12.

Another type of guidance consists of guiding the piston 8 externally on the inner wall of a transparent tube 20, made of glass or sapphire, or the like, in particular with the interposition of buffer rings housed in circular grooves in the piston 8, which buffer rings provide guidance in this transparent tube.

In order to determine the 5-minute interval applicable, the mechanism according to the invention controls the release of the corresponding piston 8, by closing the flap 16 of the piston 8 of the 5-minute interval that has just ended, and by opening the flap 16 of the piston 8 corresponding to the new 5-minute interval that has just begun. The opening of the flap 16, which is preferably located at the distal end of the piston 8, opposite the connecting rod assembly, reveals a highly-visible, coloured mark 140, for example a red surface, or a surface treated with a reflective material, or any other surface that provides a good visual contrast with the outside of the piston 8. This visual mark 14 can obviously be used as an index, when the cylinder 30, or a transparent tube 20 comprised therein, comprises graduations 306, to determine the current minute within the 5-minute interval.

Advantageously, the piston 8 comprises a piston body 15, and a flap 16, which makes the visual mark 14 visible when released, and otherwise conceals it, and which has a limited axial stroke in relation to the piston body 15. The flap 16 is pushed radially outwards relative to the watch when released by a flap control mechanism which will be described hereinbelow. When the flap 16 is engaged, it is held in position by an elastic mechanism, comprising a jumper 17 which holds this flap 16 against a hooking part 18 fixed to the piston body 15.

The flap control mechanism more particularly comprises a minute wheel set 201, in particular a minute ring or disc, which bears the cam 2, and is driven by the movement 200 of the watch 1000 and makes one revolution per hour. This cam 2 comprises a radial projection 202 with an upper track 208 the diameter whereof is greater than that of a lower track 209 comprised in the rest of the cam 2, and to which it is joined by ramps 206. The cam 2 is arranged to radially push a feeler 19, which is specific to each piston 8, and which is guided in a fixed part of the structure 900, of the middle, or of the watch case, and which penetrates the piston 8, and is arranged to push the flap 16 during activation. This feeler 19 advantageously comprises a spring arm 190, which bears against this same fixed part, to ensure that it is held on the cam 2. At the end of the 5 minutes, the feeler 19 leaves the upper track 208 of the projection 202 of the cam 2 and falls back onto the lower track 209, and the spring arm 190 pushes it back towards the centre of the movement, thus freeing the flap 16.

The pistons 8 are engaged at the end of each 5-minute interval, when the piston 8 radially reaches the bottom of its respective cylinder, in the position thereof located the furthest from the centre of the movement. The piston 8 is thus manoeuvred by its respective connecting rod 4 or 5, against the jumper 17, also towards the centre of the movement, and this manoeuvre by the connecting rod resets the flap 16 of this piston 8 to the closed position.

The movement 200 drives a series of hour pinions 3, with one pinion 3 driving each hour body 30. For example, the movement 200 drives a central brass wheel 309, comprising an annular bearing, the straight internal toothing whereof meshes with straight intermediate steel pinions 302; each of these pinions 302 mesh with a straight-toothed brass plate 303 which bears a conical intermediate steel wheel 304; the latter meshes with a straight-toothed steel 45° setting wheel 305, which engages a conical hour pinion 3, also made of steel. The hour body 30 is advantageously made of a light alloy, for example an aluminium or titanium alloy. The piston 8 and the flap 16 are preferably made of steel with a DLC or similar coating on the contact surfaces thereof.

The figures show the preferred alternative embodiment wherein the hour bodies 30 are rigid structures, in particular made of, but not limited to, metal. A machined tube representing the one or more digits 301 of the hour displayed in a given cylinder 10 provides good legibility, and is moreover easy to fix to the hour pinion 3, by conventional horological means: screwing, riveting, driving, or other means. As stated hereinabove, this or these one or more digits 301 are also advantageously complemented by a visual dynamic index 307 intended to be aligned with a static index 308 so as to remove any doubt for the user. Each hour pinion 3 is preferably a conical pinion, which cooperates with a conical wheel 34, with an axis parallel to the central axis D of the movement 200, directly or in this case through a setting wheel 305 inclined at 45° shown in the figures. A block formed by the hour body 30 and the hour pinion 3 thereof is advantageously guided by a ball bearing block 22, fixed to the structure 900, or to the middle or to the case, which guarantees good positioning accuracy while ensuring little energy is consumed by friction. This ball bearing block 22 is advantageously combined with and sealingly bears against the at least partially transparent casing 20 which is used to surround both the hour body 30 and the piston 8 contained therein.

Another alternative embodiment mentioned hereinabove relates to a transparent hour body 30 bearing the one or more hour markings, and is more suited to static timepieces such as clocks where the tubular diameters can be large enough not to impair legibility; more specifically, the existence of multiple reflections in two coaxial transparent tubular structures having small radii in a watch is liable to interfere with the reading of the other minute display at the piston.

It is understood energy is consumed in an isolated manner during each change of 5-minute interval. Excess energy should be managed the rest of the time.

Figure 27:
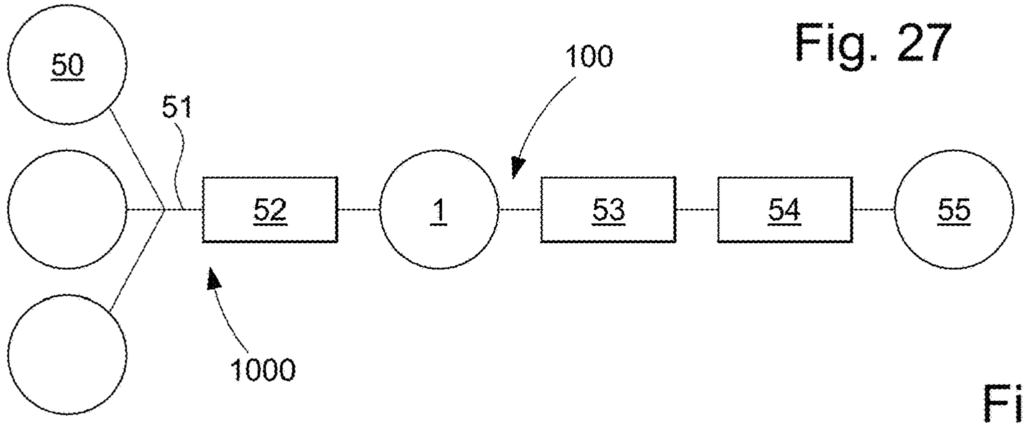
FIG. 27 is a block diagram of a first alternative embodiment of a timepiece comprising a display mechanism according to the invention.

According to a first alternative embodiment, shown in FIG. 27, for optimal energy management, the timepiece 1000, which comprises a horological movement 200, advantageously comprises a plurality of barrels 50 in parallel and/or in series, the resulting single output 51 whereof powers a multiplying train 52, which powers at least one crankshaft 1, which powers a constant-force device 53, which powers the escapement 54 which cooperates in a conventional manner with the oscillator 55. The paralleling of the barrels 50 releases a high torque for the crankshaft 1. The constant-force device 53 releases a known, controlled and optimal force for the regulator 55.

Figure 28:
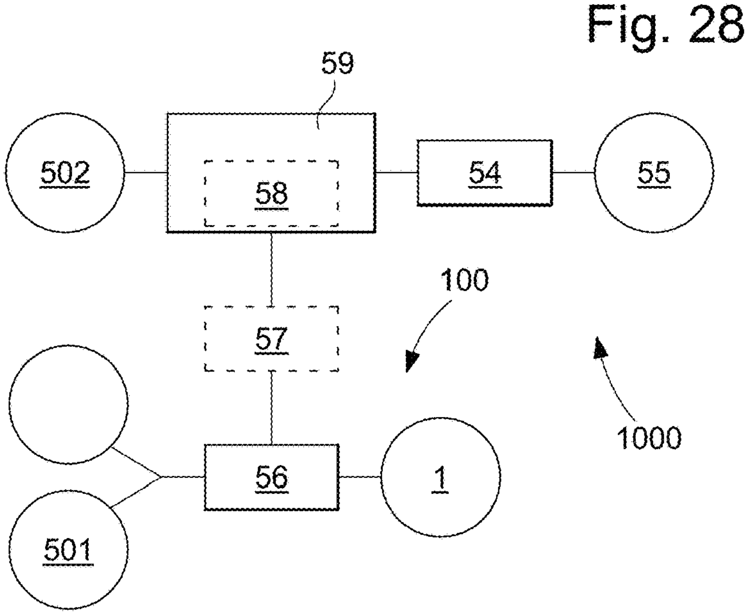
FIG. 28 is a block diagram of a second alternative embodiment of a timepiece comprising a display mechanism according to the invention.
Figure 29:
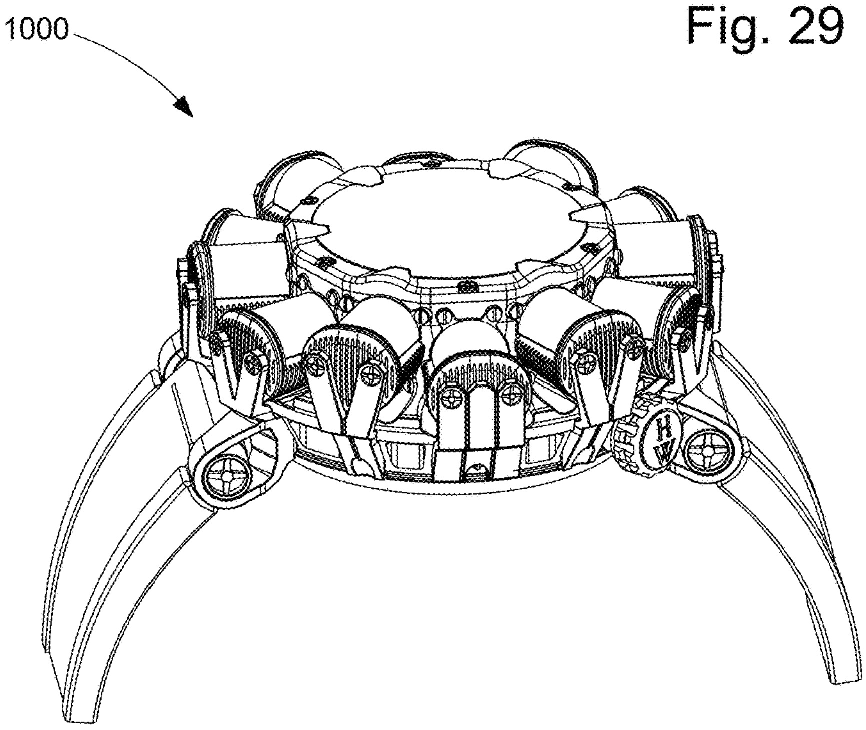
FIG. 29 diagrammatically shows a perspective view of a watch comprising a display mechanism according to the invention.

According to a second alternative embodiment, shown in FIG. 28, and for the same purpose, the timepiece 1000 comprises two energy circuits, one for powering the crankshaft 1 and the other for powering the oscillator 55. At least two first barrels 501, or groups of barrels, are in parallel, powering the crankshaft 1 of the display mechanism 100 via a first multiplying train 56, which in turn is regulated by a first escapement mechanism 57 under the control of a geometric release mechanism 58. At least one independent, second barrel 502, or group of barrels, powers the oscillator 55 through a second multiplying train 59 and a second escapement mechanism 54. The geometric release mechanism 58 of the first multiplying train 56 is kinematically linked to and regulated by the second multiplying train 59 regulated by the oscillator 55. The advantage of this solution, which is slightly more complex than the first alternative embodiment, is that it ensures that the running accuracy of the watch is not disrupted by the operation of the crankshaft 1.

Although the invention is described here in a configuration having twelve cylinders 10, it is understood that it can be implemented, depending on the nature of the desired displays, with a different number of cylinders: 2, 3, 4, or 6 cylinders, or a different number. Coaxial display with a first display and a second display in a single cylinder is also possible.

Extrapolations can also comprise one or more cylinders 10 dedicated to different displays, for example, in addition to the hour/minute display described here, a day/night or AM/PM display in an additional cylinder. A day/night or AM/PM display in a casing 20 coaxial to the minute piston and to the hour body is also possible: for example a cylinder 10 can comprise, from the axis thereof to the periphery thereof: the minute piston 8, the hour body 30, a transparent casing with day/night marking, and another transparent casing with AM/PM marking.

24-hour displays are also possible, with colours or decorations specific to the morning displays and others specific to the evening displays; twelve cylinders 10 can thus conceivably be retained, with displays differentiated according to the time.

It goes without saying that the first displays 901 and the second displays 902 can be reversed, the first displays thus surrounding the second.

One alternative embodiment with a transparent tubular double casing and a polariser also allows a particular display to be obtained.

Illuminating the active cylinder, or active cylinders, the hour cylinder and the minute cylinder in this example can also be considered.

Thus, to summarise, the invention relates to a watch, comprising a case enclosing a movement and a display mechanism, disposed between the back of the case and the crystal. This display mechanism comprises a plurality of separate unit displays.

The case conventionally comprises a middle, a bezel bearing an upper crystal, and a back with or without a lower crystal.

The moving unit displays are each housed in a unit chamber which communicates with the main chamber enclosing the movement, the sealing of the case ensuring that all the chambers are sealed. These unit displays are each housed in a protrusion forming an outgrowth of the case, each protrusion comprising a unit chamber.

The display of a same horological variable is broken down over a plurality of these unit displays.

Each unit chamber resembles an engine cylinder, and the casing of this unit chamber, formed by one of these protrusions, comprises at least one transparent part, which is arranged to allow the user to see the position of the corresponding unit display. A transparent part of each unit chamber casing is on the crystal side of the timepiece.

Each unit display resembles a carriage, or an engine piston capable of moving in a cylinder, or a shuttle in a loom groove, and circulates in a unit chamber specific thereto.

Each unit display circulates in the unit chamber thereof without contact with the inner surface of the protrusion.

More specifically, the unit display has a guide support specific thereto, a roller bearing about which a rotating unit display pivots, or a guide rod along which a translating unit display slides. It is thus not necessary for the inner surface of the casing of the unit chamber, nor the outer surface of the unit display, to be cylindrical. However, a cylindrical design, with a large radial clearance to prevent any friction that could penalise performance, is both cost-effective and aesthetically pleasing.

The supporting structure of this guide support is integral with the small plate of the movement.

Each unit display is animated by a linear or rotational motion within the unit chamber thereof.

The unit displays are disposed in a star shape, more particularly in a complete and even 360° star shape. More particularly, they are disposed about or above the movement.

The timepiece resembles an aircraft engine in the shape of a star, or a double star (two superimposed star-shaped rows), with each branch of the star comprising one or more unit displays. The unit chambers are disposed radially in relation to a common axis, about which a control mechanism of the timepiece drives wheels or rod systems for driving the different display wheel sets, by a cam mechanism, and/or crankshafts and connecting rods for linear motions, and/or by a gear train for rotary motions.

The unit chambers are disposed in a V-shape relative to one another.

Each unit display is arranged to give an indication on only part of the total range of the horological variable being displayed. They are functionally in series, each displaying the actual information in turn.

At a given moment in time, the stroke of each unit display in the unit chamber thereof is different from the strokes of the other unit displays in the respective unit chambers thereof.

The unit displays have synchronous movements in the respective unit chambers thereof.

At a given moment in time, a single unit display shows the actual value of the variable, and for this purpose the timepiece comprises a release mechanism which manoeuvres a display indicator, specific to each unit display, between an active position or an inactive position, this display indicator being visible to the user and enabling the user to simply and quickly identify the unit display that is displaying the actual value of the variable.

The same unit chamber can contain a plurality of unit displays, of different types, superimposed one on top of the other, in particular fitted inside one another.

The watch comprises twelve perforated or transparent rotating carriages for displaying the hours, which are driven from the movement by a gear train.

The watch comprises, in order to display the minutes, linear motion pistons, which are driven from the movement by a rod system and cams, by a crankshaft or camshaft system. These pistons circulate inside the rotating carriages; the user can see the longitudinal position of each piston.

Thus, at a given moment in time, a rotating carriage presents the user with the possibility of reading the full time, a device indicates which of the cylinders is showing the minutes (in five-minute intervals), and the longitudinal stroke of the piston in the corresponding chamber determines the minute reading within the five-minute interval.

According to an alternative embodiment, the timepiece comprises linear motion shuttles for displaying the minutes, which are driven from the movement by a rod system and cams. These shuttles circulate inside the rotating carriages which are partially transparent or perforated so that the user can view the longitudinal position of each shuttle. Moreover, each shuttle covers a display indicator, or is covered by a display indicator, which is controlled by the release mechanism to carry out a linear stroke relative to the shuttle thereof, in order to inform the user of the activity thereof or the inactivity thereof.

The invention allows a highly dynamic, reliable and readable mechanical display of great complication to be produced, with reasonable overall dimensions that are compatible with a wristwatch.

The invention claimed is:

1. A horological display mechanism (100), for a timepiece (1000) comprising:

a case enclosing at least one movement (200), which movement (200) comprises, about a central axis (D) defining the centre of said movement (200), a plurality of drive wheel sets, said display mechanism (100) comprising a structure (900), said display mechanism (100) comprising at least one display support (10) which encloses at least a first display (901) and a second display (902), and which is arranged for the simultaneous display of at least a first variable on a said first display (901) under the action of a first control mechanism, and of a second variable on a said second display (902) under the action of a second control mechanism, said first control mechanism and/or said second control mechanism being arranged to be driven by one of said drive wheel sets, wherein each said at least one display support (10) is a substantially cylindrical body extending radially relative to said central axis (D) about said structure (900) and said case, constitutes an outgrowth of said case, and is radially projecting from said structure (900) and from said case in the direction of a basic axis (DA), wherein each said unit display support (10) comprises a chamber which is sealed to the external environment of said timepiece (1000), and wherein one of said first display (901) and second display (902) is capable of moving in translation in a direction parallel to or coincident with said basic axis (DA) and the other of said first display (901) and second display (902) is capable of moving in rotation relative to a direction parallel to or coincident with said basic axis (DA).

2. The display mechanism (100) according to claim 1, wherein said first control mechanism and said second control mechanism are capable of being manoeuvred independently of one another.

3. The display mechanism (100) according to claim 1, wherein at least one said display support (10) comprises said first display (901) capable of moving in translation, and said second display (902) capable of moving in rotation, and in that one of said first display (901) and second display (902) surrounds the other, or vice-versa.

4. The display mechanism (100) according claim 1, wherein at least one said display support (10) comprises, in addition to said first display (901) and said second display (902), at least one flap (16) arranged for viewing the activation of said display, and which is capable of moving in translation parallel to a direction parallel to or coincident with said basic axis (DA), or which is capable of moving in rotation relative to a direction parallel to or coincident with said basic axis (DA).

5. The display mechanism (100) according to claim 1, wherein each said unit display support (10) encloses at least one indicator for displaying the value of a variable, which display indicator is either said first display (901) capable of moving in translation along said basic axis (DA) thereof, or said second display (902) capable of moving in rotation about said basic axis (DA) thereof, in that all of said unit display supports (10) comprise said display indicators of the same kind, which are either said first displays (901) for displaying a first variable, or said second displays (902) for displaying a second variable, or both said first displays (901) and said second displays (902), in that all of said display indicators are arranged so as to be visible to the user of the timepiece (1000), and in that said display mechanism (100) comprises a control mechanism (300), which is arranged to drive, about said common axis (D), wheels or rod systems for driving the different display wheel sets comprised in said display mechanism (100), and which comprises a first carrier (111), arranged to be driven by said horological movement (200) and to drive by itself all of said first displays (901) when comprised therein, and/or a second carrier (112), arranged to be driven by said horological movement (200) and to drive by itself all of said second displays (902) when comprised therein.

6. The display mechanism (100) according to claim 5, wherein said display mechanism (100) comprises, in each said unit display support (10), said first display (901) and said second display (902), which are coaxial to one another.

7. The display mechanism (100) according to claim 4, wherein each said first display (901) and/or second display (902) comprises a first optical indicator (14), which is concealed or otherwise by said flap (16) capable of moving linearly in the direction of said basic axis (DA) between an activated position and a deactivated position, in order to validate or respectively invalidate a value of said first variable, and in that said control mechanism (300) comprises a first actuator which is arranged to control, at a single said unit display support (10) at a time, the switching into the activated position, or the holding in the activated position, of said flap (16), and to control, at the same moment in time, the switching into the deactivated position or respectively the holding in the deactivated position of the flaps (16) of all of the other said unit display supports (10).

8. The display mechanism (100) according to claim 7, wherein said control mechanism (300) comprises a cam (2) controlling, directly or indirectly through at least one two-armed lever, the stroke of at least one feeler (19) in order to push, along a linear stroke, said flap (16) arranged to conceal or to reveal said first optical indicator (14), and in that said feeler (19) comprises at least one elastic arm (190; 497) arranged to bear against a structure (900; 498) and tending to repel said feeler (19) towards said cam (2).

9. The display mechanism (100) according to claim 7, wherein each said flap (16) is capable of moving linearly between a said activated position and said deactivated position relative to a moving support (8) or a piston, comprised in said first display (901), and which is itself capable of moving linearly in the same direction as said basic axis (DA), between two stroke end positions, with a periodic motion.

10. The display mechanism (100) according to claim 9, wherein said first display (901) comprises a jumper (17) arranged to hold said flap (16), in the engaged position, against a hooking part (18) fixed to said moving support (8), and to allow the release thereof when said feeler (19) recoils and said moving support (8) reverses direction.

11. The display mechanism (100) according to claim 5, wherein said display mechanism (100) comprises said first display (901) in each said unit display support (10), and in that said first carrier (111) comprises a crankshaft (1), arranged to be driven by a said horological movement (200), and at least one crank pin (41) whereof drives at least one plate (40) bearing fixed (4) or articulated (5) connecting rods, each arranged to move said first display (901) in an alternating, linear to-and-fro motion.

12. The display mechanism (100) according to claim 5, wherein said display mechanism (100) comprises said second display (902) in each said unit display support (10), and in that each said second display (902) comprises a second optical indicator which is capable of moving linearly in the direction of said basic axis (DA) between an activated position and a deactivated position, in order to validate or respectively invalidate a value of said second variable, and in that said control mechanism (300) comprises a second actuator which is arranged to control, at a single said unit display support (10) at a time, the switching into the activated position or the holding in the activated position of said second optical indicator, and to control, at the same moment in time, the switching into the deactivated position or respectively the holding in the deactivated position, of the second optical indicators of all of the other said unit display supports (10), and in that said control mechanism (300) comprises a gear train with reduction mechanisms to drive all of said second displays (902) synchronously.

13. The display mechanism (100) according to claim 5, wherein said display mechanism (100) comprises said second display (902) in each said unit display support (10), and in that said second display (902) comprises a tubular body (30) bearing at least one identification marking and comprising at least one cut-out and/or transparent surface to reveal to the user any component comprised in said display mechanism (100) housed inside said tubular body (30).

14. The display mechanism (100) according to claim 1, wherein each said display support (10) is fixed, either to a structure (900) which is an additional plate placed on said movement (200), or to said case or to a middle comprised in said case, and in that said control mechanism (300) comprises at least said first carrier (111), arranged to be driven by a minute wheel set of said movement (200), and/or said second carrier (112) arranged to be driven by an hour wheel set of said movement (200), and wherein said display mechanism (100), or said movement (200), comprises, at the interface between said display mechanism (100) and said horological movement (200), an adjustable friction wheel set engaged on said movement (200) to enable the time of said display mechanism (100) to be set, by the winding and setting stem of said movement (200).

15. The display mechanism (100) according to claim 5, wherein said timepiece (1000) comprises a plurality of barrels (50) in parallel and/or in series, a single resulting output (51) whereof powers a multiplying train (52) which powers at least said first carrier (111) of said display mechanism (100), which first carrier (111) comprises a crankshaft (1) arranged to be driven by said movement (200), which crankshaft (1) powers a constant-force device (53), which powers an escapement (54) which cooperates with an oscillator (55) comprised in said movement (200).

16. The display mechanism (100) according to claim 15, wherein said timepiece (1000) comprises two energy circuits arranged to cooperate through a first escapement mechanism (57), the first circuit for powering at least said first carrier (111) of said display mechanism (100), which first carrier (111) comprises a crankshaft (1) arranged to be driven by said horological movement (200), and the second circuit for powering an oscillator (55) comprised in said horological movement (200).

17. The display mechanism (100) according to claim 16, wherein said first circuit comprises at least two first barrels (501), or groups of barrels, which are in parallel and power said crankshaft (1) via a first multiplying train (56), itself regulated by said first escapement (57) under the control of a geometric release mechanism (58) regulated by a second multiplying train (59) comprised in said second circuit and which is regulated by an oscillator (55) comprised in said horological movement (200).

18. The display mechanism (100) according to claim 16, wherein said second circuit comprises at least one second barrel (502), or group of barrels, independent of said first circuit, and which is arranged to power said oscillator (55) through a second multiplying train (59) and a second escapement mechanism (54), said second multiplying train (59) being arranged to control a geometric release mechanism (58) of said first escapement (17) in order to regulate a first multiplying train (56) comprised in said first circuit.

19. The display mechanism (100) according to claim 1, wherein each said display support (10) is formed by a substantially cylindrical body which has the shape of an aircraft engine cylinder.

20. The display mechanism (100) according to one of claim 1, wherein said display mechanism (100) comprises a plurality of said separate display supports (10) each extending in said basic axis direction (DA) radial to said common axis (D), and in that the display of a given variable is broken down over a plurality of said display supports (10), each activated at a specific moment in time.

21. The display mechanism (100) according to claim 20, wherein all said display supports (10) each cover an identical unit range, which corresponds to an integer submultiple of the scope of the overall range of said given variable.

22. The display mechanism (100) according to claim 20, wherein the same said separate display supports (10) are arranged for displaying a plurality of different variables, the display of each whereof is broken down over said display supports (10), each activated at a specific moment in time in order to display each said variable.

23. A timepiece (1000) comprising a case enclosing at least one movement (200), which movement (200) comprises, about a central axis (D) defining the centre of said movement (200), a plurality of drive wheel sets, and comprising at least one display mechanism (100) according to claim 1.

24. The timepiece (1000) according to claim 23, wherein said timepiece (1000) is a watch.

* * * * *